US012663685B2

(12) United States Patent

Hayashi

(10) Patent No.: US 12,663,685 B2

(45) Date of Patent: Jun. 23, 2026

(54) DISPLAY DEVICE

(71) Applicant: Japan Display Inc., Tokyo (JP)

(72) Inventor: Hirotaka Hayashi, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 558 days.

(21) Appl. No.: 18/296,386

(22) Filed: Apr. 6, 2023

(65) Prior Publication Data

US 2023/0324760 A1 Oct. 12, 2023

(30) Foreign Application Priority Data

Apr. 11, 2022 (JP) ................................. 2022-065133

(51) Int. Cl.
| | |
|---|---|
| *G02F 1/167* | (2019.01) |
| *G02F 1/16761* | (2019.01) |
| *G02F 1/16766* | (2019.01) |
| *G09G 3/34* | (2006.01) |

(52) U.S. Cl.
CPC .......... *G02F 1/167* (2013.01); *G02F 1/16761* (2019.01); *G02F 1/16766* (2019.01); *G09G 3/344* (2013.01)

(58) Field of Classification Search
CPC ............... G02F 1/167; G02F 1/133377; G02F 1/134309; G02F 1/1368; G02F 1/1676; G02F 1/16766; G02F 1/1681; G02F 1/0107; G02F 1/16755; G02F 1/16761; G02F 1/133345; G02F 1/1362; G02F 1/16756; G09G 3/3446; G09G 2300/023
See application file for complete search history.

(56) References Cited

U.S. PATENT DOCUMENTS

| | | | |
|---|---|---|---|
| 2006/0290649 A1 | 12/2006 | Johnson et al. | |
| 2008/0136772 A1* | 6/2008 | Minami .................. | G02F 1/167 |
| | | | 345/107 |
| 2020/0251597 A1 | 8/2020 | Ikeda et al. | |
| 2020/0319522 A1 | 10/2020 | Hayashi et al. | |

FOREIGN PATENT DOCUMENTS

| | | | | |
|---|---|---|---|---|
| JP | 2006-525546 A | 11/2006 | | |
| JP | 2020-126218 A | 8/2020 | | |
| JP | 6959359 B2 | 11/2021 | | |
| WO | WO 2019131409 | * | 7/2019 | ......... G02F 1/16766 |

* cited by examiner

*Primary Examiner* — Brandi N Thomas
(74) *Attorney, Agent, or Firm* — XSENSUS LLP

(57) ABSTRACT

According to one embodiment, an electrophoretic display device includes an array substrate including a base material, a common electrode on the base material, a plurality of pixel electrodes provided to face the common electrode, and an insulating layer provided between the common electrode and the pixel electrodes, a counter-substrate facing the array substrate, an electrophoretic layer including a plurality of electrophoretic elements and disposed between the array substrate and the counter-substrate, and a drive unit which drives the electrophoretic elements by a lateral electric field generated between the pixel electrodes and the common electrode.

19 Claims, 28 Drawing Sheets

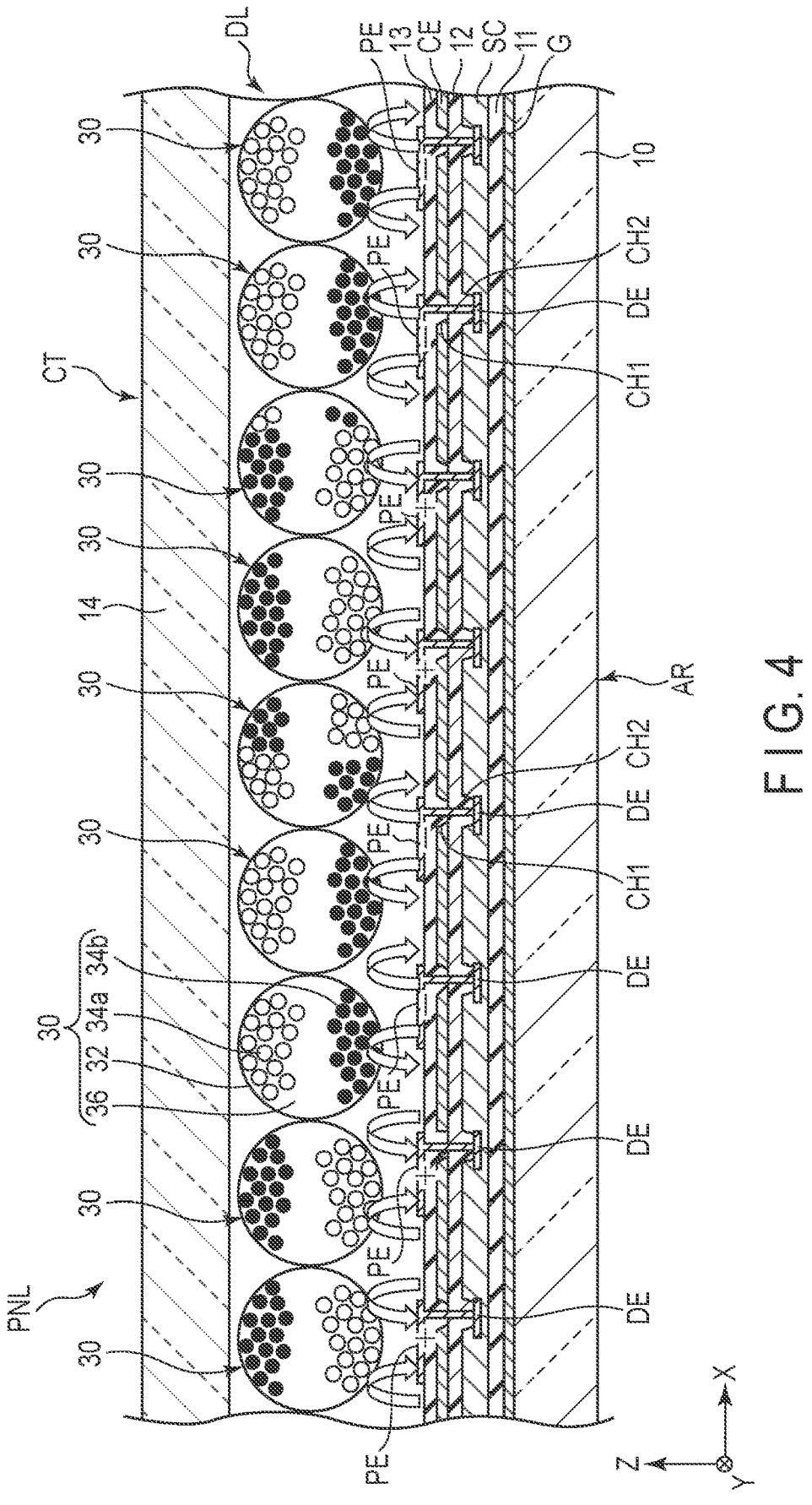
F I G. 4

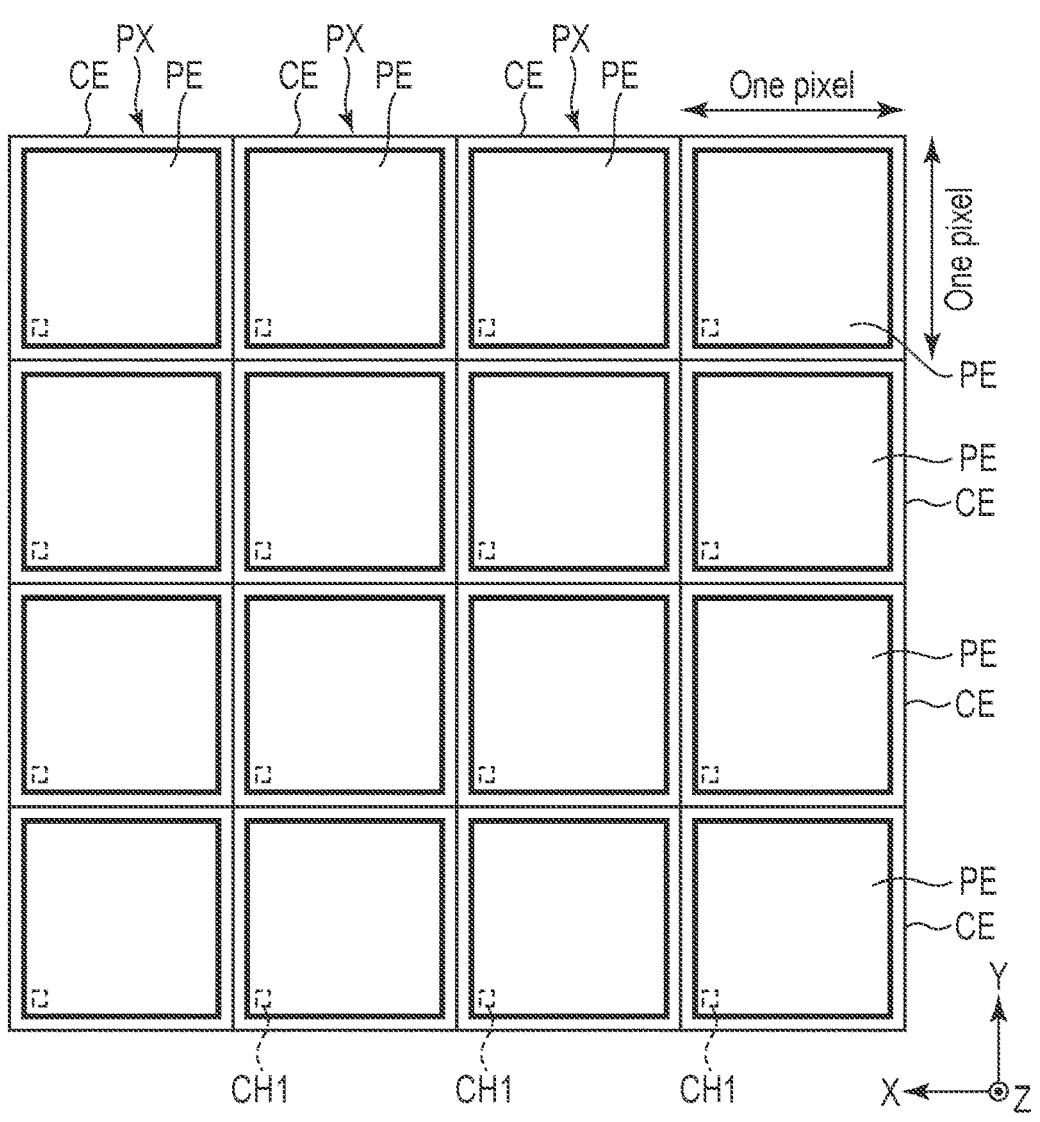
F I G. 5
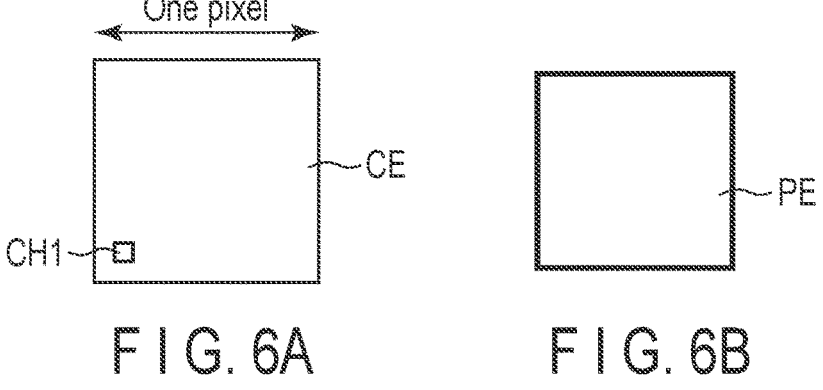
F I G. 6A  F I G. 6B

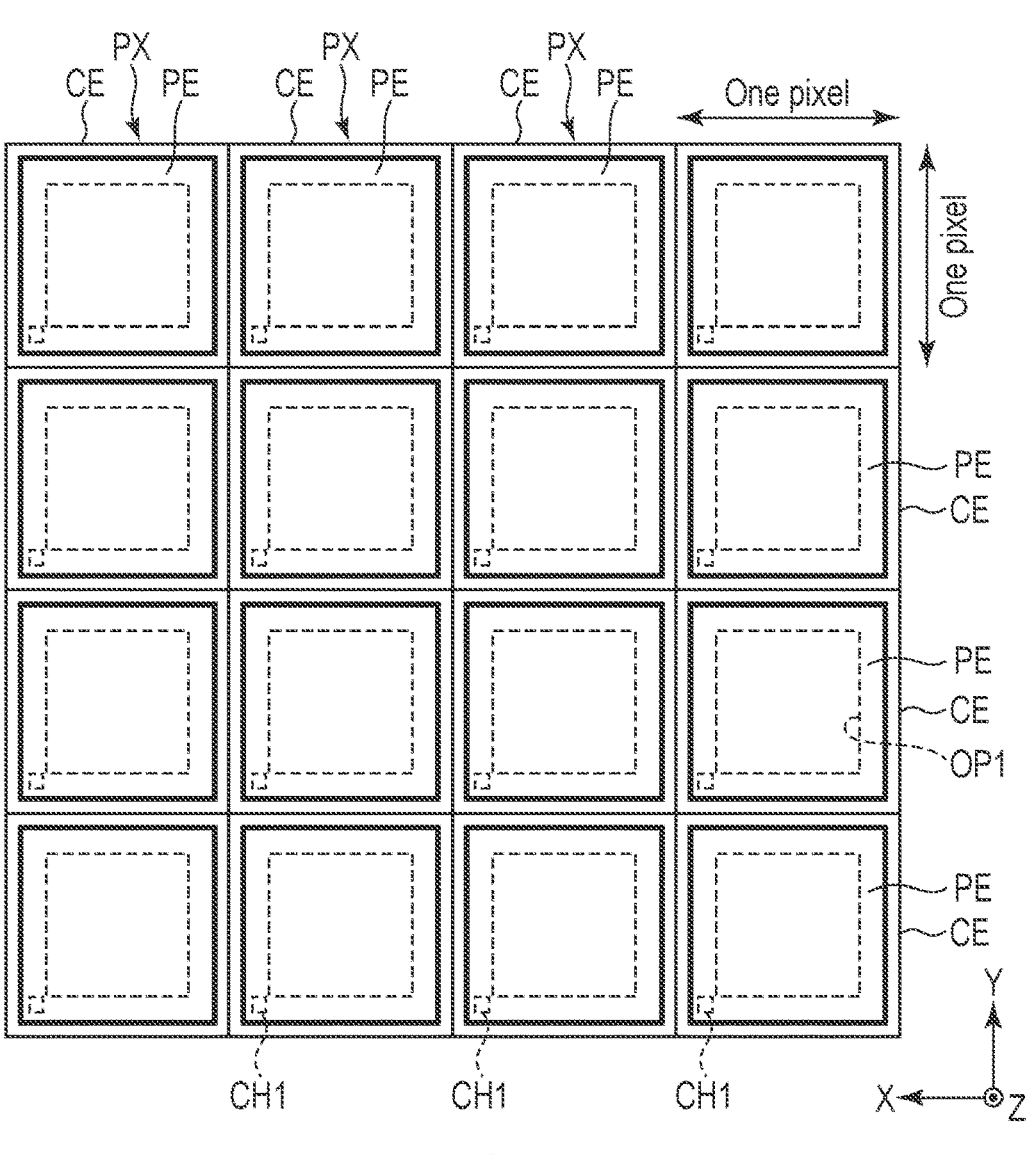
FIG. 7
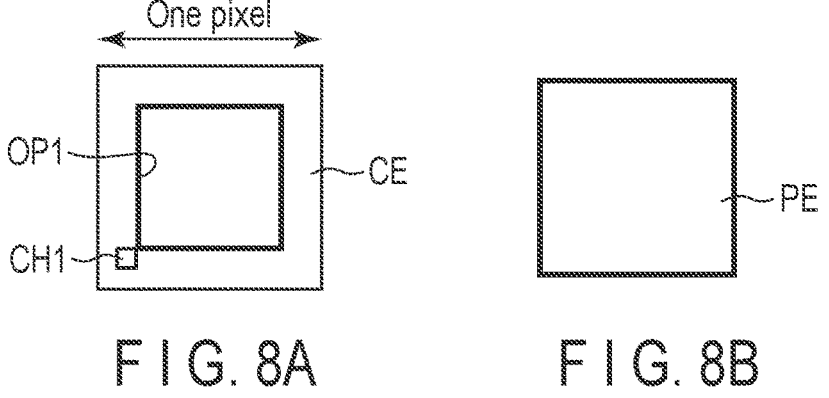
FIG. 8A                    FIG. 8B

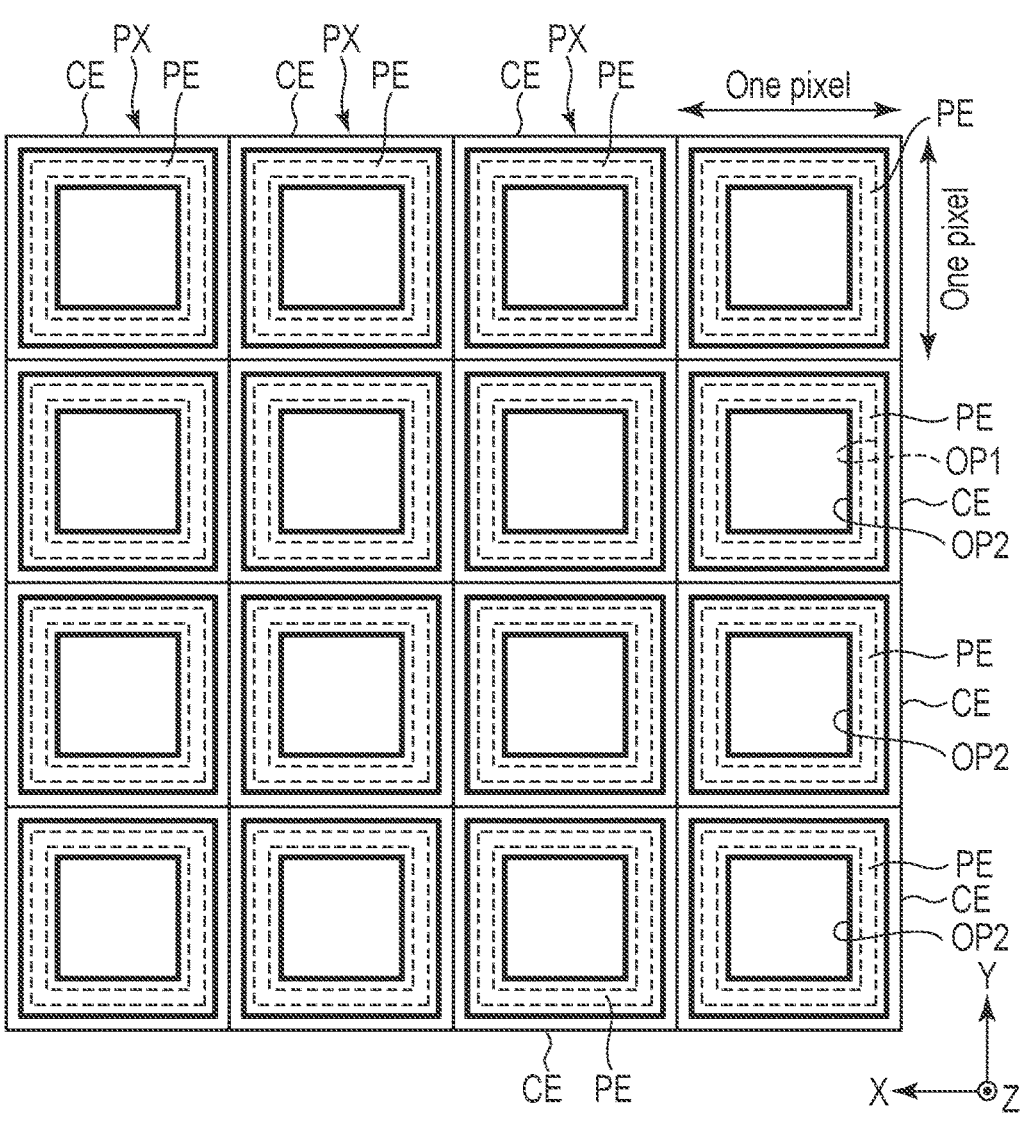
F I G. 11
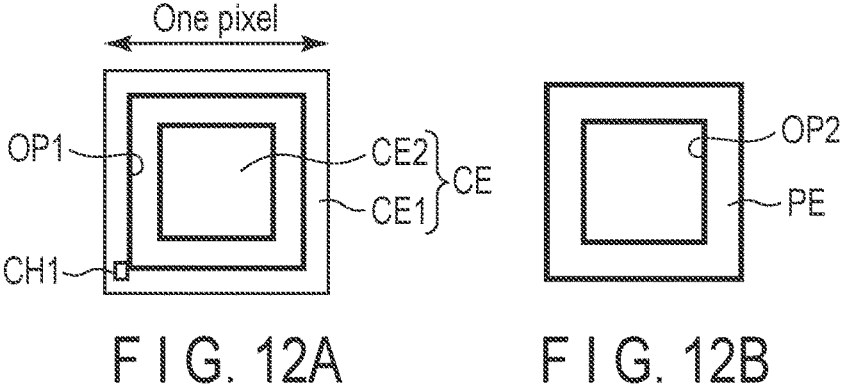
F I G. 12A          F I G. 12B

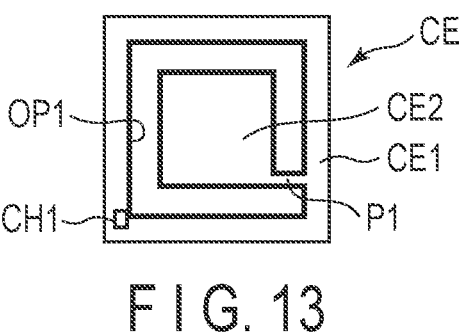
F I G. 13
F I G. 14

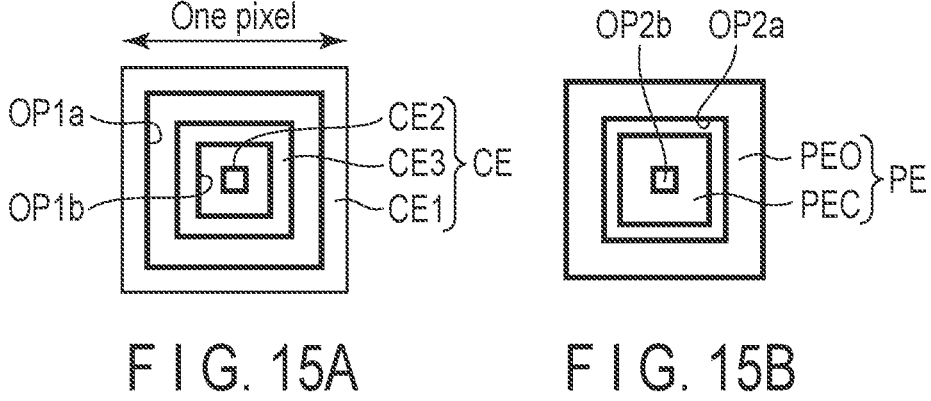
F I G. 15A          F I G. 15B
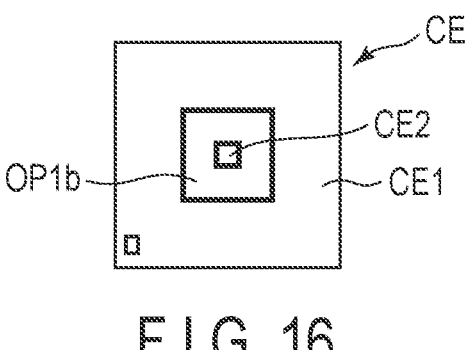
F I G. 16

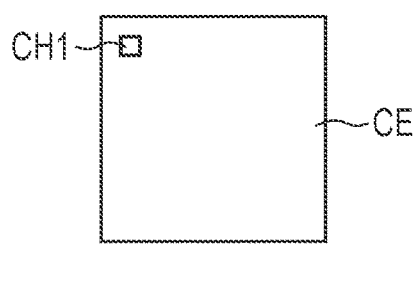
CH1 —▫
— CE
F I G. 21
PE1  CE  PE    PE1  CE  PE    PE1  CE  PE    One pixel  OP1
                                                        PE1
One pixel
CE
PE
CE
OP1
PE1
PE1
PE
CE
PE1
CE
PE1      PE1
   OP1  PE1  OP1  PE1
Y
X ← ⊙ Z
F I G. 22

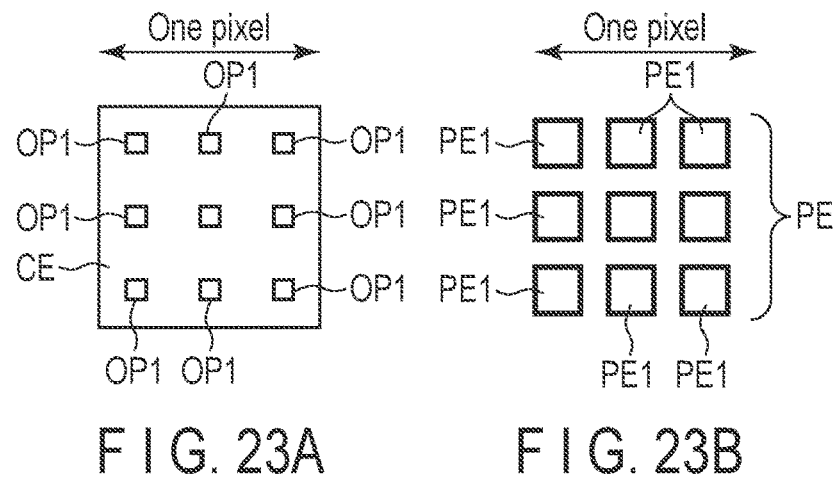
F I G. 23A          F I G. 23B
F I G. 24

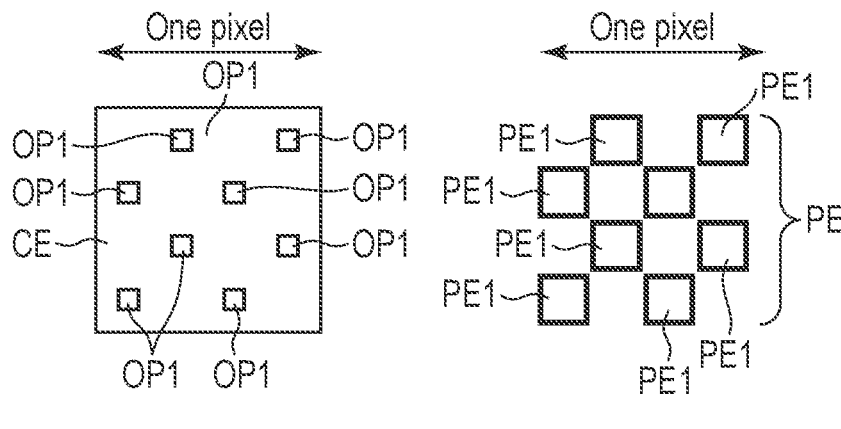
F I G. 25A          F I G. 25B
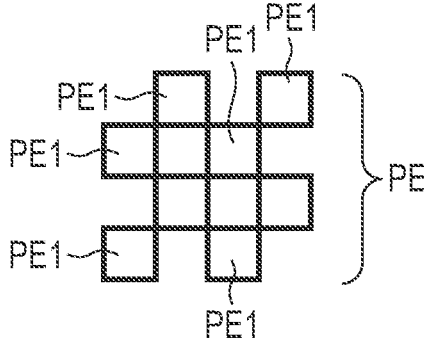
F I G. 26

One pixel
One pixel
PE
CE
PE
CE
PE
CE
PE
CE
PE
CE
PE1
PE
CE
PE1
OP1
PE
CE
PE1
OP1
Y
X ← ⊙ Z
F I G. 27
One pixel
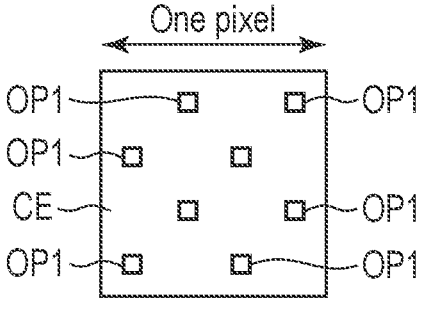
OP1
OP1
CE
OP1
OP1
OP1
OP1
F I G. 28A
One pixel
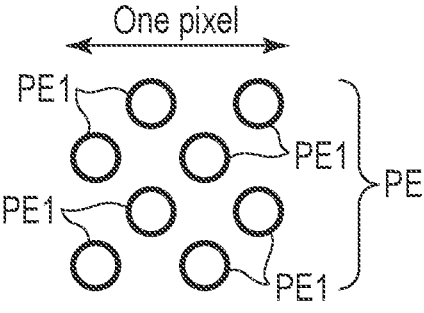
PE1
PE1
PE1
PE
PE1
F I G. 28B

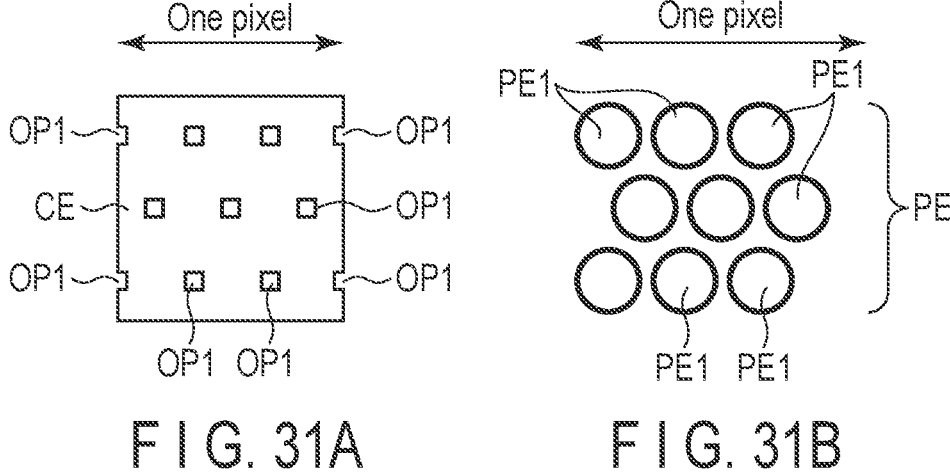
F I G. 31A                    F I G. 31B
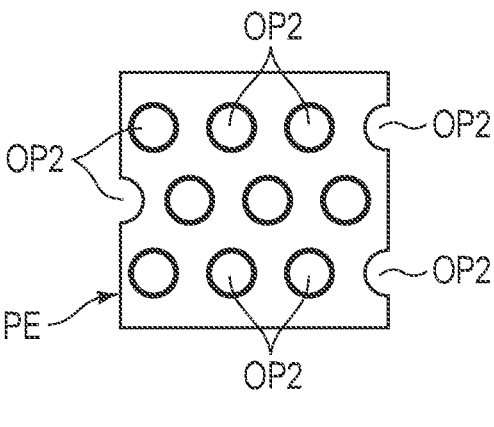
F I G. 32

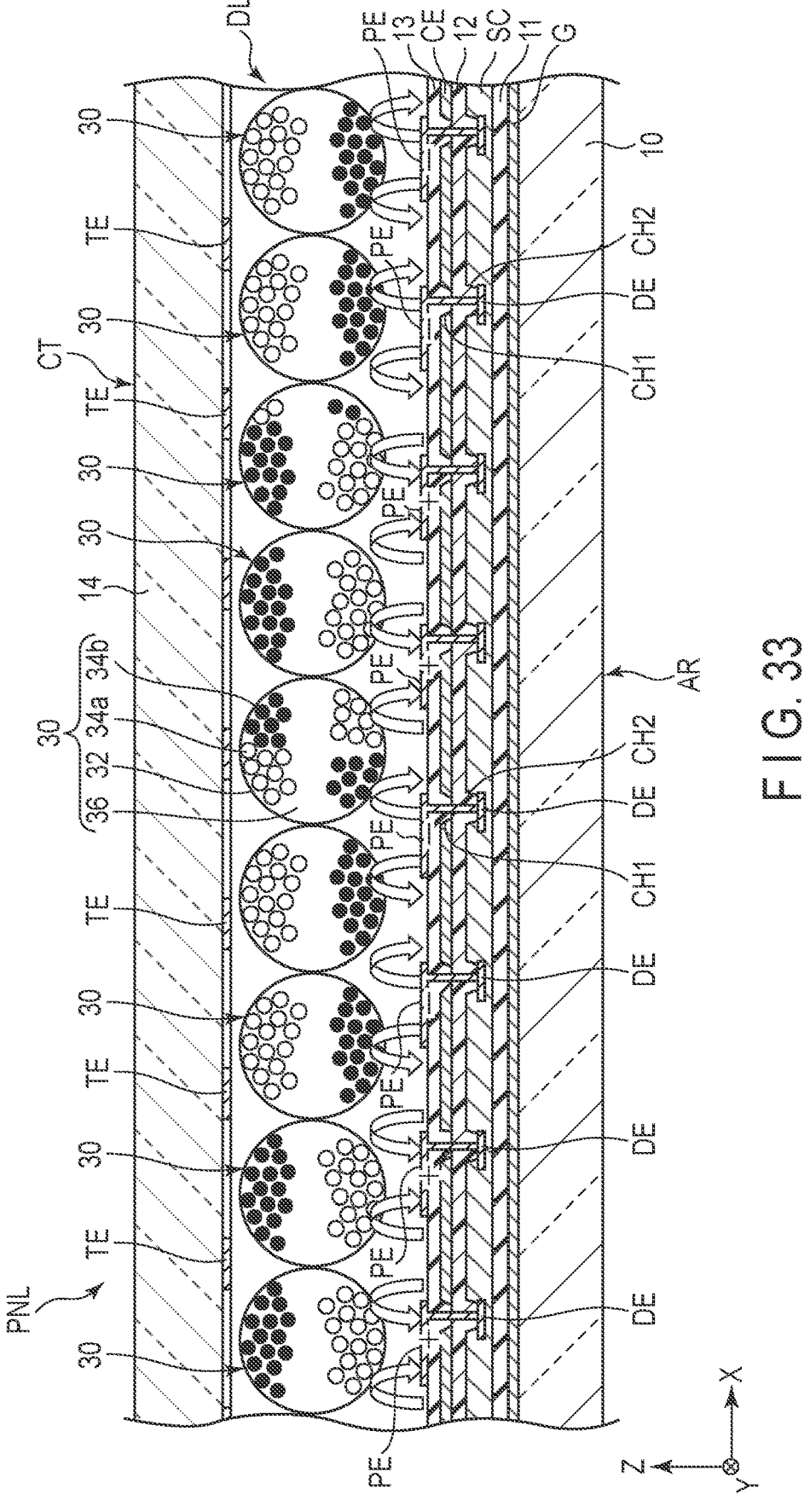
F I G. 33

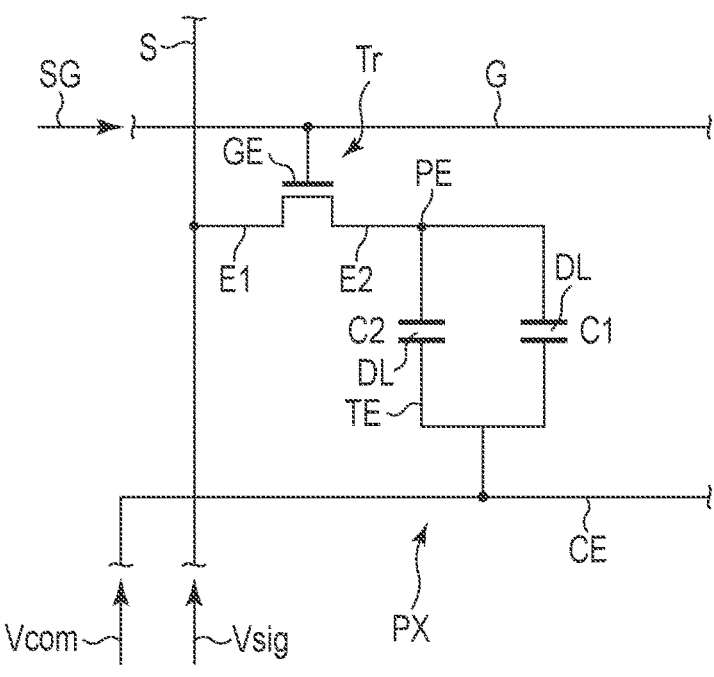
F I G. 34A
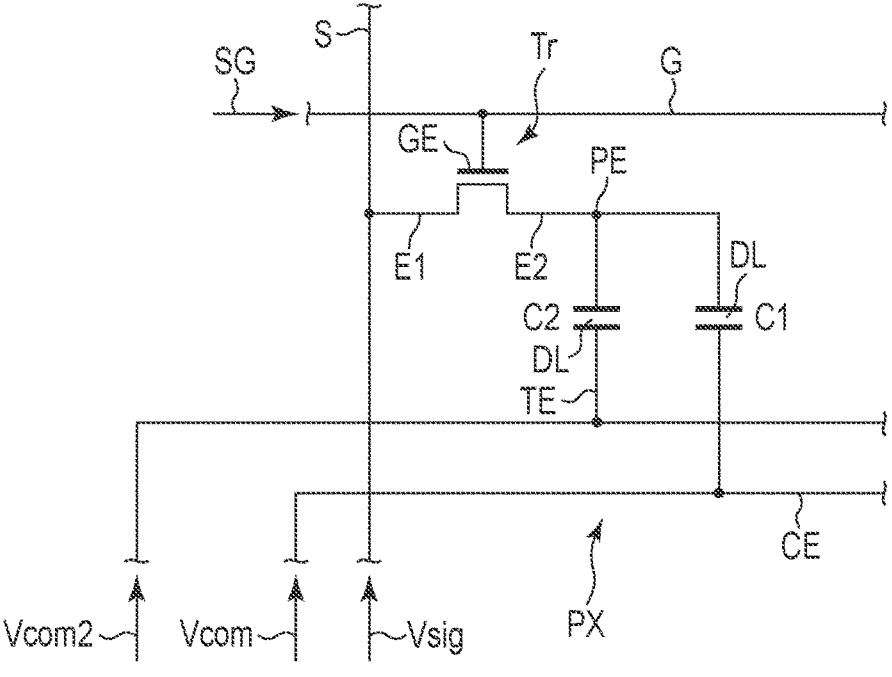
F I G. 34B

F I G. 35
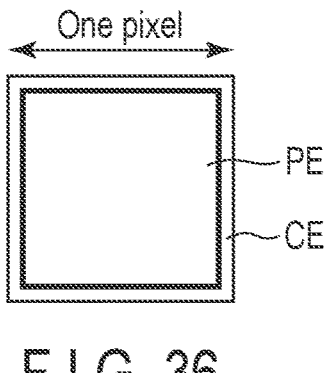
F I G. 36

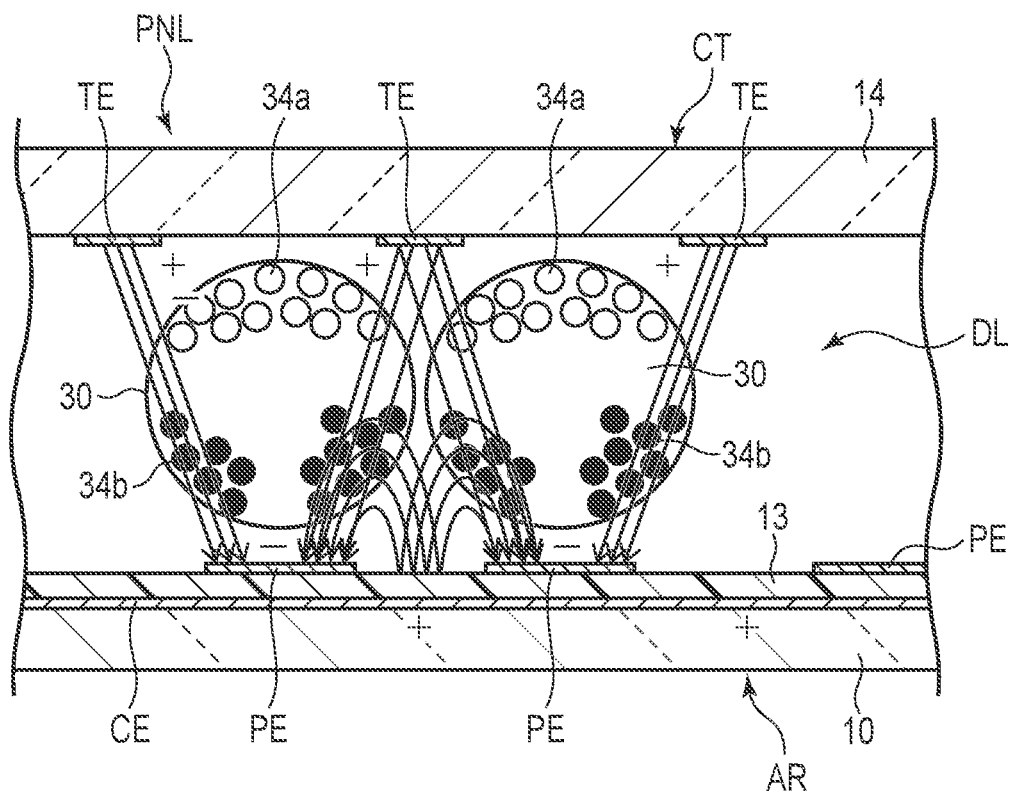
F I G. 37

F I G. 38
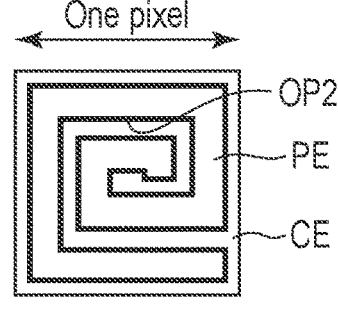
F I G. 39

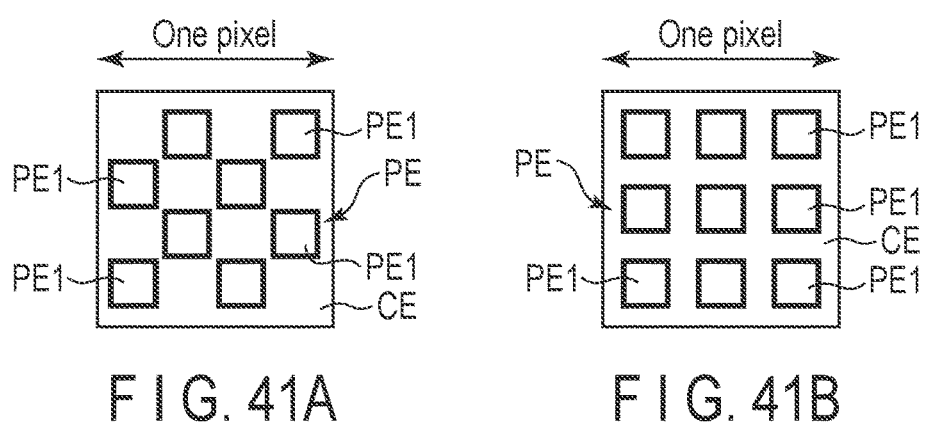
F I G. 40
F I G. 41A          F I G. 41B

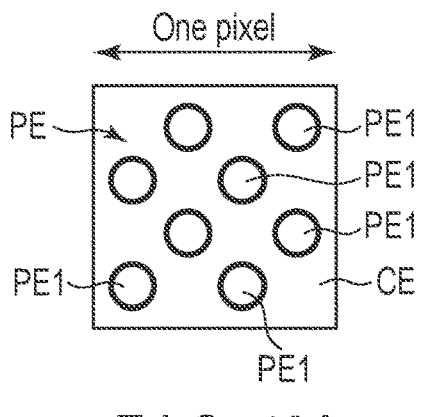
F I G. 42A
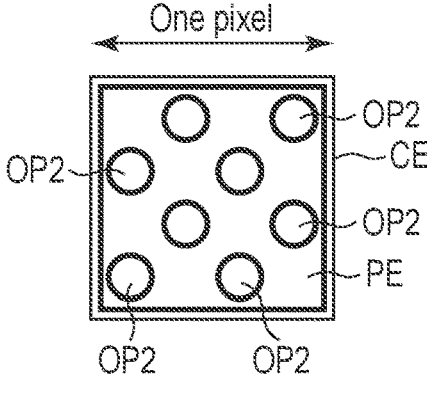
F I G. 42B
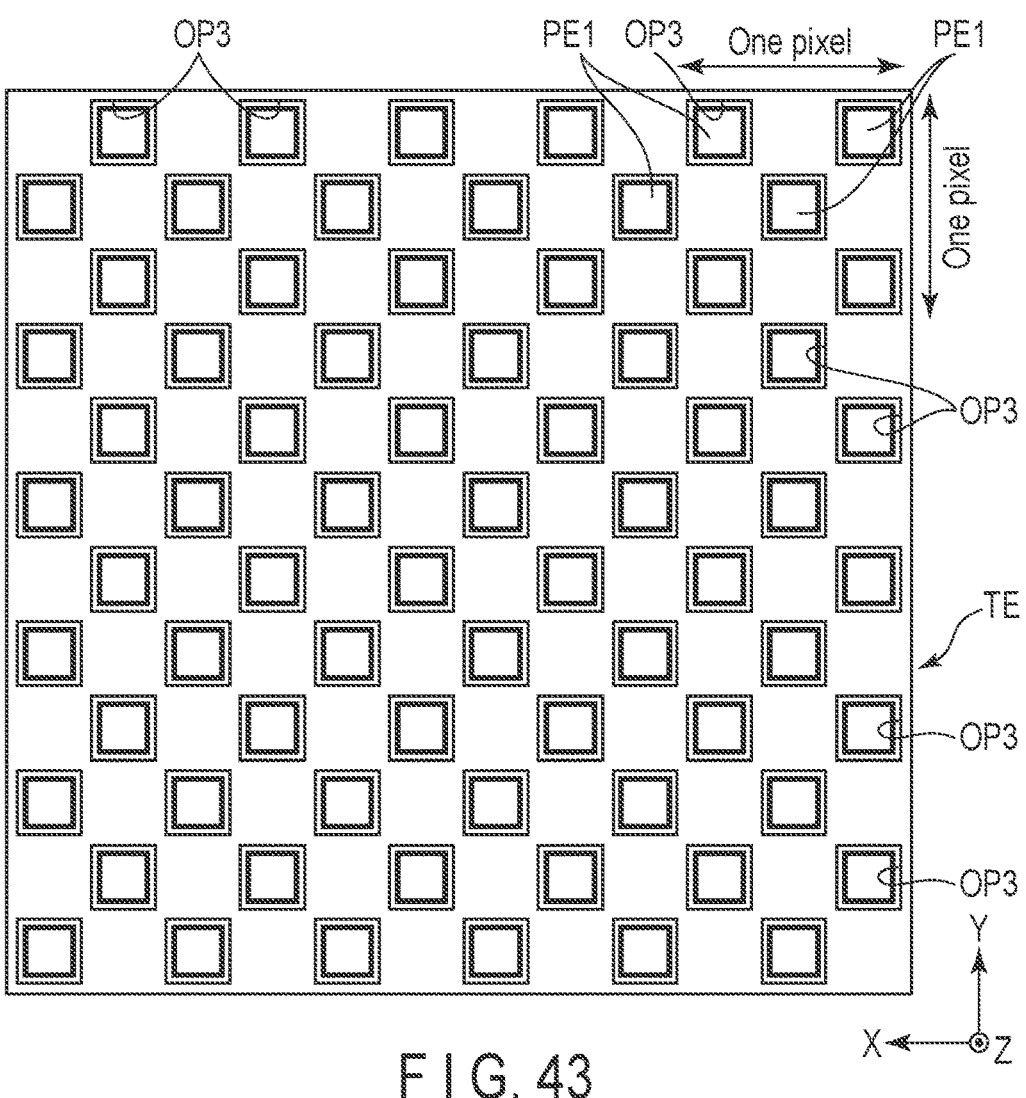
F I G. 43

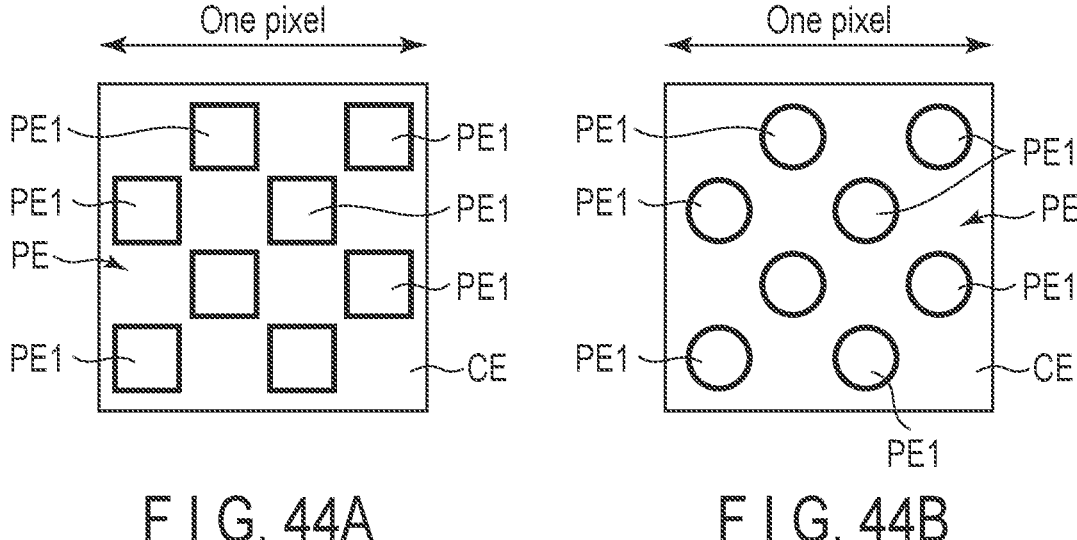
F I G. 44A            F I G. 44B
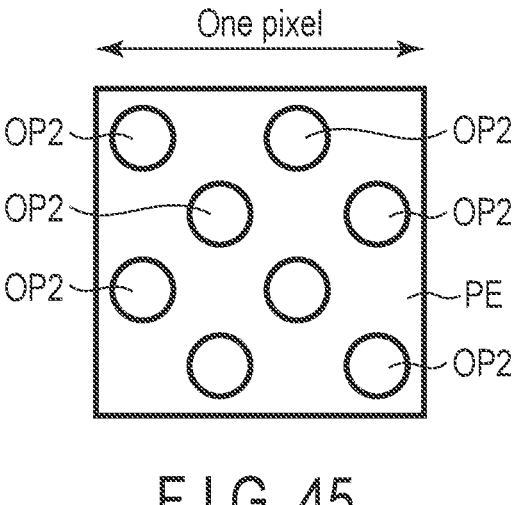
F I G. 45

FIG. 46
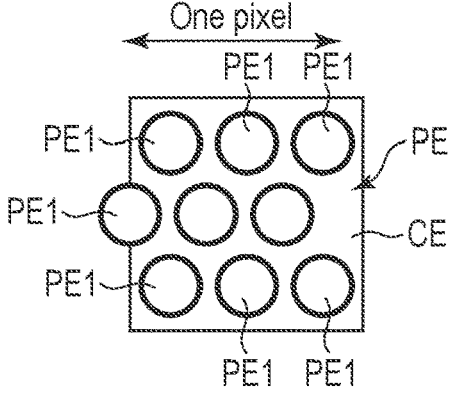
FIG. 47A
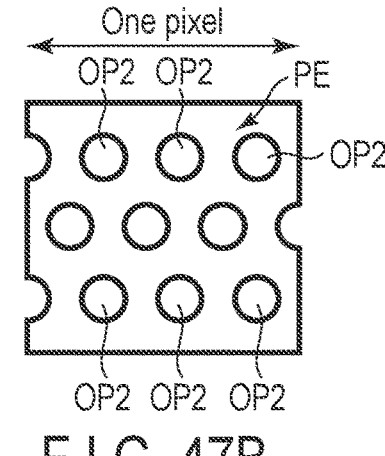
FIG. 47B

DISPLAY DEVICE

CROSS-REFERENCE TO RELATED APPLICATIONS

This application is based upon and claims the benefit of priority from Japanese Patent Application No. 2022-065133, filed Apr. 11, 2022, the entire contents of which are incorporated herein by reference.

FIELD

Embodiments described herein relate generally to a display device using an electrophoretic element.

BACKGROUND

As an example of a display device, an electrophoretic display device has been proposed in which an electrophoretic element having microcapsules arranged therein is disposed between an array substrate and a counter-substrate. The electrophoretic display device has a storage property of holding a potential at the time of rewriting an image. Therefore, the electrophoretic display device does not need to apply a voltage to maintain the display state, and can be driven with low power consumption.

In the electrophoretic display device, improvement of display performance is desired.

BRIEF DESCRIPTION OF THE DRAWINGS

FIG. 4 is a schematic cross-sectional view of a display panel included in the display device according to the first embodiment.

FIG. 5 is a plan view schematically showing an array pattern example of common electrodes and pixel electrodes in an array substrate of the display panel.

FIG. 6A is a plan view illustrating the common electrode for one pixel.

FIG. 6B is a plan view illustrating the pixel electrode for one pixel.

FIG. 7 is a plan view schematically illustrating an array pattern of common electrodes and pixel electrodes according to a first modification.

FIG. 8A is a plan view illustrating the common electrode for one pixel of the array pattern according to the first modification.

FIG. 8B is a plan view illustrating the pixel electrode for one pixel of the array pattern according to the first modification.

FIG. 11 is a plan view schematically illustrating an array pattern of common electrodes and pixel electrodes according to a third modification.

FIG. 12A is a plan view illustrating the common electrode for one pixel of the array pattern according to the third modification.

FIG. 12B is a plan view showing the pixel electrode for one pixel of the array pattern according to the third modification.

FIG. 13 is a plan view of the common electrode for one pixel illustrating another a connection example in the third modification.

FIG. 14 is a plan view schematically illustrating an array pattern of common electrodes and pixel electrodes according to a fourth modification.

FIG. 15A is a plan view illustrating the common electrode for one pixel of the array pattern according to the fourth modification.

FIG. 15B is a plan view showing the pixel electrode for one pixel of the array pattern according to the fourth modification.

FIG. 16 is a plan view illustrating another example of the common electrode for one pixel in the fourth modification.

FIG. 21 is a plan view illustrating another example of the common electrode for one pixel in the fifth modification.

FIG. 22 is a plan view schematically illustrating an array pattern of common electrodes and pixel electrodes according to a sixth modification.

FIG. 23A is a plan view illustrating the common electrode for one pixel of the array pattern according to the sixth modification.

FIG. 23B is a plan view showing the pixel electrode for one pixel of the array pattern according to the sixth modification.

FIG. 24 is a plan view schematically illustrating an array pattern of common electrodes and pixel electrodes according to a seventh modification.

FIG. 25A is a plan view illustrating the common electrode for one pixel of the array pattern according to the seventh modification.

FIG. 25B is a plan view showing the pixel electrode for one pixel of the array pattern according to the seventh modification.

FIG. 26 is a plan view illustrating another example of the pixel electrode for one pixel in the seventh modification.

FIG. 27 is a plan view schematically illustrating an array pattern of common electrodes and pixel electrodes according to an eighth modification.

FIG. 28A is a plan view schematically illustrating the common electrode for one pixel of the array pattern according to the eighth modification.

FIG. 28B is a plan view illustrating the pixel electrode for one pixel of the array pattern according to the eighth modification.

FIG. 31A is a plan view illustrating the common electrode for one pixel of the array pattern according to the ninth modification.

FIG. 31B is a plan view showing the pixel electrode for one pixel of the array pattern according to ninth modification.

FIG. 32 is a plan view illustrating another example of the pixel electrode for one pixel in the ninth modification.

FIG. 33 is a schematic cross-sectional view of a display panel included in a display device according to a second embodiment.

FIG. 34A is an equivalent circuit diagram applicable to a pixel of the display panel illustrated in FIG. 33.

FIG. 34B is an equivalent circuit diagram illustrating an equivalent circuit according to a modification.

FIG. 35 is a plan view schematically showing an array pattern example of common electrodes and pixel electrodes on a counter-substrate of the display panel.

FIG. 36 is a plan view illustrating the pixel electrode for one pixel.

FIG. 37 is a cross-sectional view schematically illustrating an action state of a lateral electric field and an oblique electric field in the display panel.

FIG. 38 is a plan view schematically showing an array pattern of counter-electrodes and pixel electrodes according to a tenth modification.

FIG. 39 is a plan view showing a common electrode and the pixel electrode for one pixel of the array pattern according to the tenth modification.

FIG. 40 is a plan view schematically showing an array pattern of counter-electrodes and pixel electrodes according to an eleventh modification.

FIG. 41A is a plan view illustrating a common electrode for one pixel of the array pattern according to the eleventh modification.

FIG. 41B is a plan view showing the pixel electrode for one pixel of the array pattern according to the eleventh modification.

FIG. 42A is a plan view illustrating the common electrode for one pixel of the array pattern according to the eleventh modification.

FIG. 42B is a plan view showing the pixel electrode for one pixel of an array pattern according to the eleventh modification.

FIG. 43 is a plan view schematically showing an array pattern of counter-electrodes and pixel electrodes according to a twelfth modification.

FIG. 44A is a plan view illustrating a common electrode and the pixel electrode for one pixel of the array pattern according to the twelfth modification.

FIG. 44B is a plan view showing another example of the common electrode and the pixel electrode for one pixel of the array pattern according to the twelfth modification.

FIG. 45 is a plan view showing another example of the pixel electrode for one pixel of the array pattern in the twelfth modification;

FIG. 46 is a plan view schematically showing an array pattern of counter-electrodes and pixel electrodes according to a thirteenth modification;

FIG. 47A is a plan view illustrating a common electrode and the pixel electrode for one pixel of the array pattern according to the thirteenth modification;

FIG. 47B is a plan view showing another example of the pixel electrode for one pixel of the array pattern according to the thirteenth modification;

DETAILED DESCRIPTION

Various embodiments will be described hereinafter with reference to the accompanying drawings. In general, according to one embodiment, an electrophoretic display device comprises an array substrate including a base material, a common electrode provided on the base material, a plurality of pixel electrodes provided to face the common electrode, and an insulating layer provided between the common electrode and the pixel electrodes; a counter-substrate facing the array substrate; an electrophoretic layer including a plurality of electrophoretic elements and disposed between the array substrate and the counter-substrate; and a drive unit which drives the electrophoretic elements by a lateral electric field generated between the pixel electrodes and the common electrode.

Note that the disclosure is presented for the sake of exemplification, and any modification and variation conceived within the scope and spirit of the invention by a person having ordinary skill in the art are naturally encompassed in the scope of invention of the present application. Furthermore, a width, thickness, shape, and the like of each element are depicted schematically in the figures as compared to actual embodiments for the sake of simpler explanation, and they do not limit the interpretation of the invention of the present application. Furthermore, in the description and Figures of the present application, structural elements having the same or similar functions will be referred to by the same reference numbers and detailed explanations of them that are considered redundant may be omitted.

In each embodiment, an electrophoretic display device is disclosed as an example of the display device. However, each embodiment does not preclude the application of the individual technical ideas disclosed in each embodiment to other types of display devices. Examples of the other types of display devices include a liquid crystal display device having a liquid crystal layer, an organic EL display device in which a light emitting layer is disposed in each pixel, and an LED display device in which a small LED is disposed in each pixel.

First Embodiment

Figure 1:
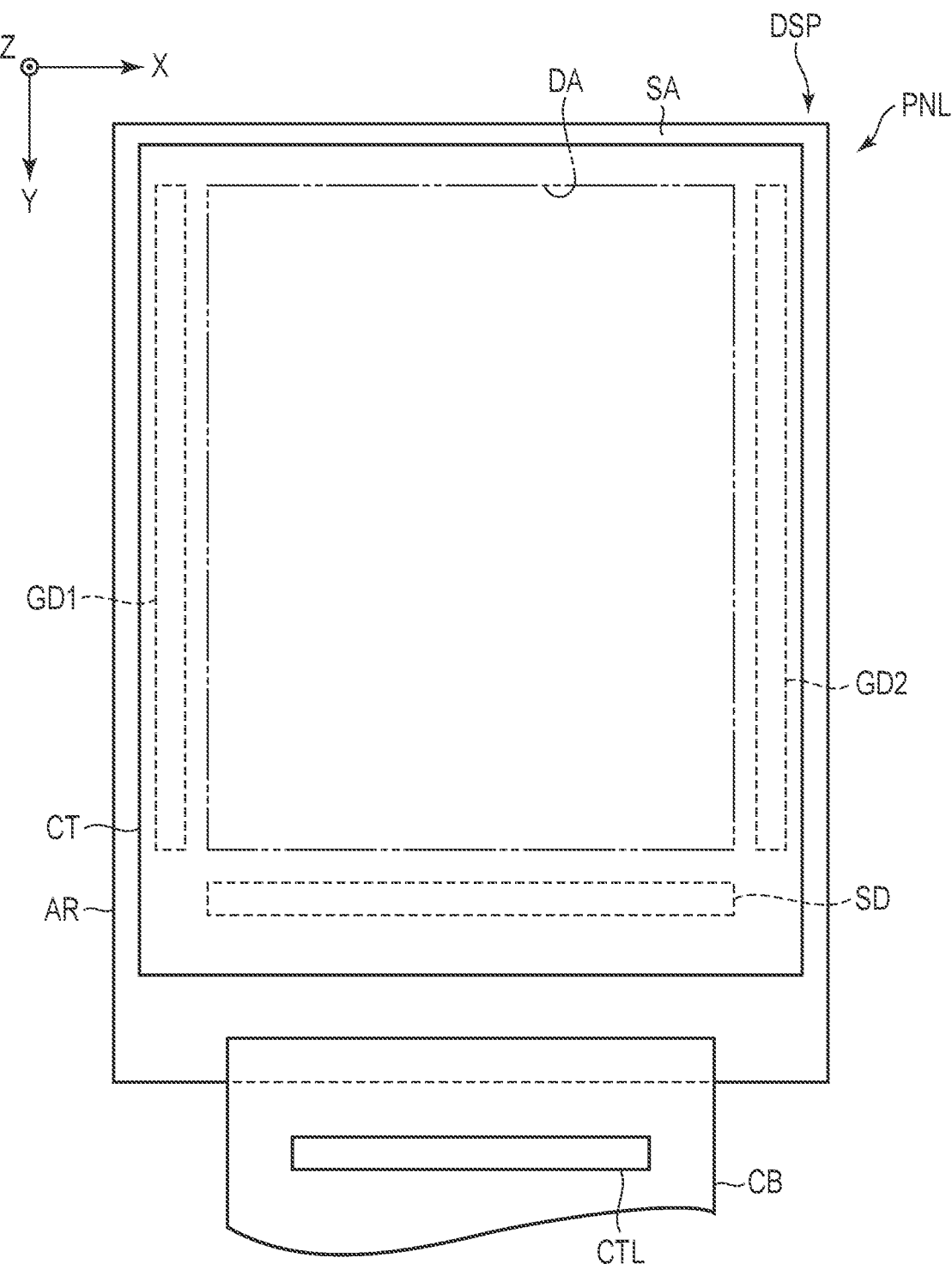
FIG. 1 is a plan view illustrating a configuration of a display device according to a first embodiment.

FIG. 1 is a plan view illustrating a configuration of a display device DSP according to a first embodiment. In the present embodiment, an electrophoretic display device using electrophoretic elements or electronic ink is disclosed as an example of the display device DSP.

As shown in FIG. 1, a first direction X, a second direction Y and a third direction Z are defined. Note that in the embodiments, the first direction X, the second direction Y and the third direction Z are orthogonal are orthogonal to each other, but may intersect at an angle other than ninety degrees. The first direction X and the second direction Y correspond to directions parallel to a main surface of each substrate which constitutes the display device DSP, and the third direction Z corresponds to a thickness direction of each element of the display device DSP.

In the following descriptions, with such expressions "a second member above a first member" and "a second member below a first member", the second member may be in contact with the first member or may be remote from the first member. In the latter case, a third member may be interposed between the first member and the second member. In addition, viewing the display device DSP and its elements from the direction parallel to the third direction Z (the normal direction) is referred to as plan view.

The display device DSP includes an active matrix-type display panel PNL, a wiring board CB, and a controller CTL. The display panel PNL includes an array substrate AR, a counter-substrate CT facing the array substrate AR in the third direction Z, and an electrophoretic layer to be described later arranged between the array substrate AR and the counter-substrate CT. In the example of FIG. 1, the array substrate AR and the counter-substrate CT have a rectangular shape having a short side parallel to the first direction X and a long side parallel to the second direction Y. However, the shapes of the array substrate AR and the counter-substrate CT are not limited to this example.

The display panel PNL includes a display region DA for displaying an image and a peripheral region SA around the display region DA. In the present embodiment, the peripheral region SA has a frame shape. The display panel PNL includes gate drivers GD1 and GD2 and a source driver SD. The gate drivers GD1 and GD2 supply a scanning signal to scanning lines to be described later. The source driver SD supplies an image signal to signal lines to be described later.

The wiring board CB is connected to the array substrate AR. The controller CTL is, for example, an IC chip, and is mounted on the wiring board CB. The controller CTL supplies a drive signal to the gate drivers GD1 and GD2 and the source driver SD via the wiring board CB or the like. The controller CTL may also be mounted at another position such as the array substrate AR.

Note that the gate drivers GD, the source driver SD, the wiring board CB, and the controller CTL described above constitute an example of a drive unit in the present application.

Figure 2:
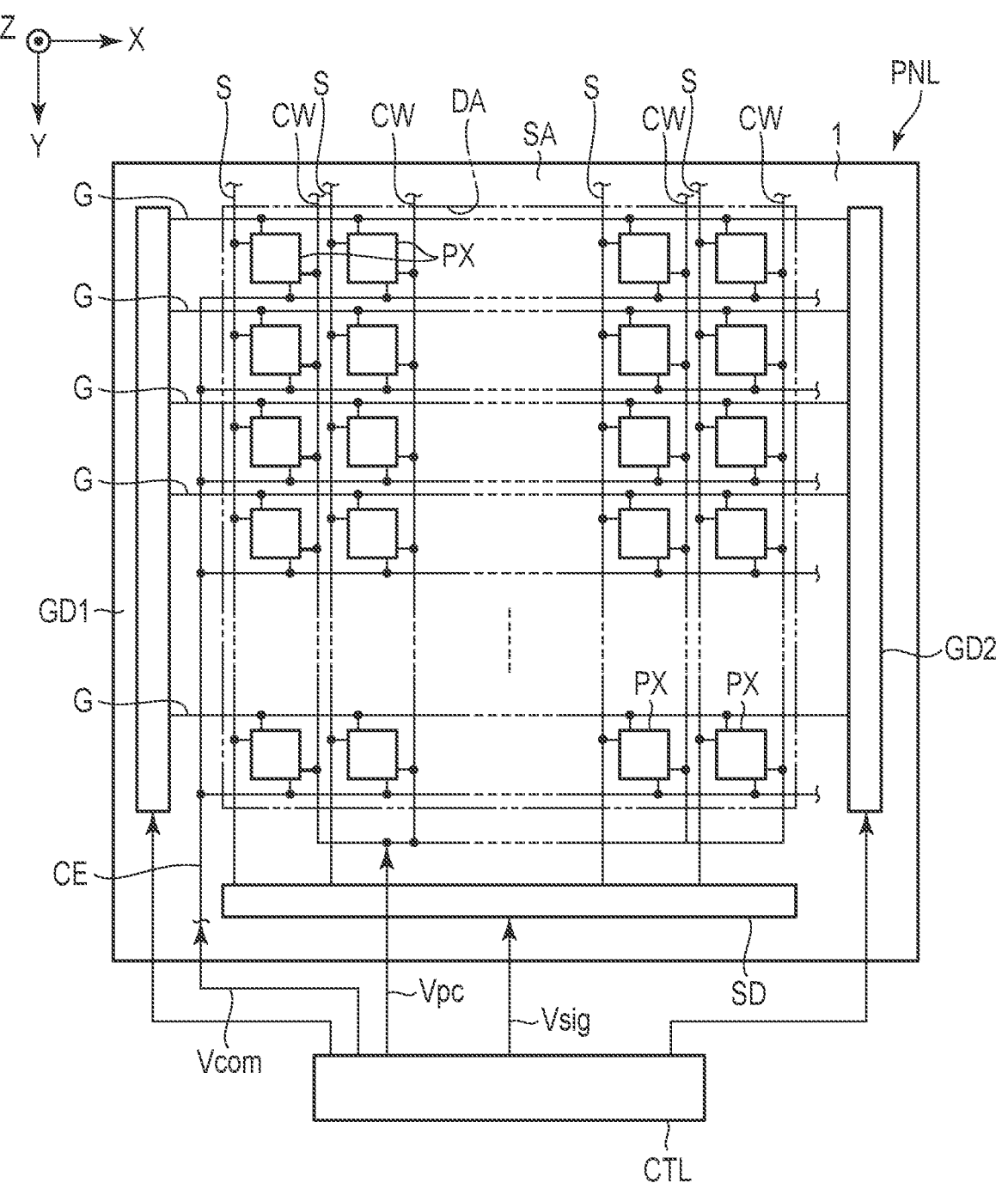
FIG. 2 is a schematic circuit diagram of the display device according to the first embodiment.
Figure 3:
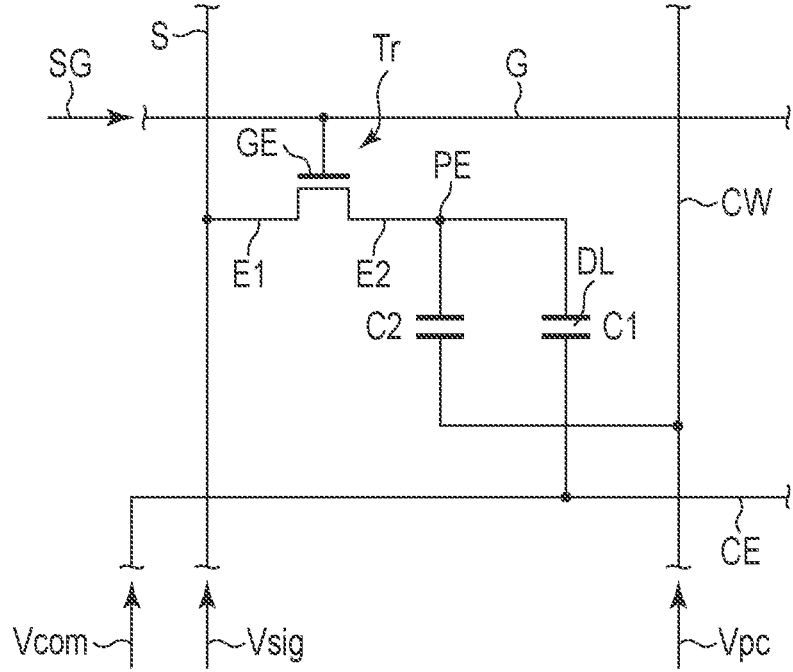
FIG. 3 is an equivalent circuit diagram applicable to a pixel illustrated in FIG. 2.

FIG. 2 is a schematic circuit diagram of the display device DSP. FIG. 3 is an equivalent circuit diagram applicable to a pixel PX illustrated in FIG. 2. As illustrated in FIGS. 2 and 3, the display panel PNL includes a first base material 10, a plurality of pixels PX, a plurality of scanning lines G, a plurality of signal lines S, a plurality of capacitive lines CW, and a common electrode CE. The plurality of pixels PX are arrayed in a matrix in the display region DA. The plurality of pixels PX, the plurality of scanning lines G, the plurality of signal lines S, the plurality of capacitive lines CW, and the common electrode CE are arranged above the first base material 10.

The plurality of scanning lines G extend in the first direction X and are arranged in the second direction Y. Each scanning line G is connected to one of the gate drivers GD1 and GD2, and is connected to the plurality of pixels PX arranged in the first direction X. The plurality of signal lines S extend in the second direction Y and are arranged in the first direction X. Each signal line S is connected to source driver SD, and is connected to the plurality of pixels PX arranged in second direction Y. The plurality of capacitive lines CW extend in the second direction Y and are arranged in the first direction X. Each of the capacitive lines CW is connected to the controller CTL and is connected to the plurality of pixels PX arranged in the second direction Y.

The gate drivers GD1 and GD2 supply a scanning signal SG to the scanning lines G. The controller CTL supplies an image signal (or video signal) Vsig to the source driver SD. The source driver SD supplies the image signal Vsig to corresponding signal line S. The controller CTL supplies a voltage Vpc to the capacitive lines CW. In addition, the controller CTL supplies a common voltage Vcom to the common electrode CE. For example, the voltage Vpc and the common voltage Vcom have the same potential.

As illustrated in FIG. 3, each pixel PX includes a transistor Tr, a first capacitance C1, a second capacitance C2, a pixel electrode PE, and the common electrode CE. In the present embodiment, the pixel electrode PE and the common electrode CE are provided on the first base material 10.

The transistor Tr is formed of, for example, a P-channel thin film transistor (TFT). A semiconductor layer of the transistor Tr is formed of an oxide semiconductor. Note that a semiconductor other than an oxide semiconductor such as polycrystalline silicon, such as low-temperature polycrystalline silicon, and amorphous silicon may be used as the semiconductor layer. The transistor Tr may also be formed of an N-channel TFT.

The transistor Tr includes a first electrode E1, a second electrode E2, and a gate electrode GE. One of the first electrode E1 and the second electrode E2 functions as a source electrode, and the other functions as a drain electrode. In the transistor Tr, the first electrode E1 is connected to the signal line S, the second electrode E2 is connected to the pixel electrode PE, and the gate electrode GE is connected to the scanning line G. As a result, the transistor Tr is switched to a conductive state or a non-conductive state by the scanning signal SG provided to the scanning line G. The image signal Vsig is supplied to the pixel electrode PE via the signal line S and the transistor Tr in the conductive state. A common potential Vcom is supplied to the common electrode CE.

The first capacitance C1 is formed between the pixel electrode PE and the common electrode CE. The second capacitance C2 is formed between the pixel electrode PE and the capacitive line CW. The potential of the image signal Vsig supplied to the pixel electrode PE is held by the first capacitance C1 and the second capacitance C2.

FIG. 4 is a schematic cross-sectional view of the display panel PNL. As illustrated in FIG. 4, the array substrate AR includes the first base material 10. A conductive layer is provided on one surface of the first base material 10, and the conductive layer is patterned to form the scanning lines G. An insulating layer 11, a semiconductor layer SC, and an insulating layer 12 are sequentially laminated on the surface of the first base material 10. The insulating layer 11 covers the scanning lines G. The semiconductor layer SC is disposed on the insulating layer 11. The insulating layer 12 covers the semiconductor layer SC and the insulating layer 11.

The common electrode CE, an insulating layer 13, and a plurality of pixel electrodes PE are provided on the insulating layer 12. The common electrode CE covers almost the entire surface of the insulating layer 12. The common electrode CE has a plurality of through holes CH1 facing the pixel electrodes. The insulating layer 13 is provided on the common electrode CE and covers the common electrode CE and the through holes CH1. The upper surface of the insulating layer 13 is flat and substantially parallel to the upper surface of the first base material 10. The plurality of pixel electrodes PE are provided on the upper surface of the insulating layer 13, and are arrayed in a matrix in the first direction X and the second direction Y. Each pixel electrode PE is connected to a drain DE of the semiconductor layer SC through the through hole CH1 and a through hole CH2 formed in the insulating layer 12 and the insulating layer 13.

The counter-substrate CT includes a second base material 14. The lower surface of the second base material 14 is flat and faces the array substrate AR substantially in parallel with a predetermined gap. In the present embodiment, the counter-substrate CT does not include a counter-electrode. A peripheral edge portion of the counter-substrate CT is attached to the array substrate AR by a seal member (not illustrated).

Materials constituting each part of the display panel PNL will be exemplified.

The first base material 10 and the second base material 14 are formed of, for example, an insulating material such as plastic or glass. In the present embodiment, since the second base material 14 is located on the screen side (observation side), it is a translucent glass substrate, a translucent resin substrate, or a translucent resin film. Since the first base material 10 is located on the opposite side of the screen, it may be opaque or transparent.

The scanning lines G are made of a material containing molybdenum. The insulating layers 11, 12, and 13 are made of an inorganic film such as a silicon oxide film and a silicon nitride film. The semiconductor layer SC is formed of an oxide semiconductor. Note that a semiconductor other than an oxide semiconductor such as polycrystalline silicon, such as low-temperature polycrystalline silicon, and amorphous silicon may be used as the semiconductor layer. The semiconductor layer SC has a source region and a drain region containing impurities such as phosphorus and boron, and a channel region located therebetween.

The pixel electrodes PE and the common electrode CE are made of a transparent conductive material such as indium tin oxide (ITO) and indium zinc oxide (IZO). The pixel electrodes PE and the common electrode CE are not limited to the light-transmissive conductive film, and may be formed of a light-shielding metal material having reflectivity.

Note that the above-described materials are merely examples. In the present embodiment, each part of the array substrate AR and the counter-substrate CT may be made of a material other than the above materials. For example, the scanning lines G may be made of aluminum, copper, silver, molybdenum, or an alloy film thereof.

As illustrated in FIG. 4, the display panel PNL includes a display function layer DL disposed between the array substrate AR and the counter-substrate CT. A voltage applied between the pixel electrodes PE and the common electrode CE acts on the display function layer DL. In the present embodiment, the display function layer DL is an electrophoretic layer, and includes a plurality of microcapsules 30 arranged with almost no gap in the X-Y plane.

The microcapsules 30 functioning as electrophoretic elements are spherical bodies having a particle size of, for example, about 20 μm to 70 μm. Although schematically shown in a small number in the illustrated example, one or a plurality of microcapsules 30 are provided in a region facing one pixel electrode PE. The microcapsules 30 are dispersedly arranged over the entire region between the array substrate AR and the counter-substrate CT, that is, over the entire region of the display region DA. The number of the microcapsules 30 arranged to face one pixel electrode PE may be larger than that in the illustrated example.

The microcapsule 30 has a spherical outer shell (outer skin) 32, and a plurality of white particles (electrophoretic particles) 34a, a plurality of black particles (electrophoretic particles) 34b, and dispersion medium 36 housed in the outer skin 32.

The outer skin 32 is formed using, for example, a polymer resin having translucency such as an acrylic resin, a urea resin, and gum arabic. The dispersion medium 36 is a liquid that disperses the white particles 34a and the black particles 34b in the microcapsules 30. Examples of the dispersion medium 36 include water, an alcohol-based solvent (methanol, ethanol, isopropanol, butanol, octanol, methyl cellosolve, and the like), and esters (ethyl acetate, butyl acetate, etc.), and other oils may be used. These substances can be used alone or as a mixture, and a surfactant or the like may be further blended.

The white particles 34a are particles (polymer or colloid) made of a white pigment such as titanium dioxide, and are negatively charged in one example. The black particles 34b are particles (polymer or colloid) made of a black pigment such as aniline black, and are positively charged in one example. Various additives can be added to these pigments as necessary. Instead of the white particles 34a and the black particles 34b, for example, pigments such as red, green, blue, yellow, cyan, and magenta may be used.

The periphery of the electrophoretic layer DL is sealed by the above-described frame-shaped sealing member. The sealing member also functions as a moisture-proof material that prevents ingress of water and moisture into the electrophoretic layer DL.

In the display panel PNL having the above configuration, when black display is performed on the electrophoretic layer (display function layer) DL, the pixel electrode PE corresponding to an arbitrary pixel PX is held at a relatively higher potential than the common electrode CE. That is, when the potential of the common electrode CE is a reference potential, the pixel electrode PE is held in a positive polarity, and a lateral electric field or an oblique electric field is formed between the pixel electrode PE and the common electrode CE. As a result, negatively charged white particles 34a are attracted to the pixel electrodes PE, while positively charged black particles 34b move toward the counter-substrate CT. As a result, when the pixel PX is observed from the counter-substrate CT side, black is visually recognized.

In the case that the pixel PX is displayed in white, when the potential of the common electrode CE is set to the reference potential, the pixel electrode PE is held in a negative polarity, and the lateral electric field or the oblique electric field is formed between the pixel electrode PE and the common electrode CE. As a result, positively charged black particles 34b are attracted to the pixel electrode PE, while negatively charged white particles 34a move toward the counter-substrate CT. As a result, when the pixel PX is observed, white is visually recognized.

As described above, in the display panel PNL, the lateral electric field or the oblique electric field is formed between the arbitrary pixel electrode PE and the common electrode CE, so that the dispersion state of the white particles 34a and the black particles 34b is changed, and arbitrary characters, images, and the like can be displayed or rewritten.

Next, an array pattern and an array structure of the common electrode CE and the pixel electrode PE will be described.

FIG. 5 is a plan view schematically illustrating an array pattern example of common electrodes and pixel electrodes in the array substrate AR of the display device according to the first embodiment. FIGS. 6A and 6B are plan views illustrating the common electrode and the pixel electrode for one pixel, respectively. Note that, in FIG. 5, in order to simplify the drawing, the insulating layers, the semiconductor layer, and the like are omitted, and only the common electrode and the pixel electrodes are illustrated.

As illustrated, according to the first embodiment, a solid electrode extending over all the pixels is used as the common electrode CE. The common electrode CE forms a plurality of common electrodes CE arranged continuously in the first direction X and the second direction Y. In one example, the shape of each common electrode CE in plan view is a rectangular shape, here, a substantially square shape. A through hole CH1 is provided in each common electrode CE.

The plurality of common electrodes CE are not limited to continuous solid electrodes, and may be a plurality of common electrodes formed independently of each other and arrayed in a two-dimensional matrix at predetermined intervals in the first direction X and the second direction Y.

The plurality of pixel electrodes PE are arrayed in a two-dimensional matrix at predetermined intervals in the first direction X and the second direction Y, and at least a part of each pixel electrode PE is arranged to overlap the common electrode CE in the third direction Z. In one example, the shape of each pixel electrode PE in plan view is formed in a rectangular shape, for example, a square shape. The pixel electrode PE is formed to have a size smaller than one pixel region of the common electrode CE. The pixel electrode PE is arranged in a state in which the substantial center thereof coincides with the center of the common electrode CE. The four sides of the pixel electrode PE are shifted toward the center side from the four sides of each common electrode CE. That is, in plan view, the peripheral edge portion of the common electrode CE is located outside the pixel electrode PE without overlapping the pixel electrode PE in the third direction Z.

Each pixel electrode PE is connected to the semiconductor layer SC through the corresponding through hole CH1 of the common electrode CE.

As described above, according to the display device DSP of the first embodiment, the plurality of pixel electrodes PE and common electrodes CE are provided on the array substrate AR of the display panel PNL, and the electrophoretic elements are driven by the lateral electric field or the oblique electric field generated between the pixel electrodes PE and the common electrodes CE. The counter-substrate CT of the display panel PNL is provided with neither the common electrode nor the counter-electrode.

That is, it is not necessary to form the common electrode or the counter-electrode on the counter-substrate CT, and an electrode formation work on the counter-substrate can be reduced. In addition, it is not necessary to supply power from the array substrate AR to the counter-substrate CT, and a transfer forming process for energization can be reduced. Furthermore, since the common electrode and the counter-electrode are eliminated from the viewing direction, the display performance corresponding to the transmittance can be improved.

From the above, according to the present embodiment, it is possible to obtain an electrophoretic display device with improved display performance and manufacturability.

In the first embodiment, the array patterns of the pixel electrodes PE and the common electrodes CE are not limited to the above-described embodiment, and can be variously changed. Hereinafter, modifications of the array pattern will be described. In various modifications described later, the same portions as those of the first embodiment described above are denoted by the same reference numerals, and the description thereof may be omitted or simplified.

(First Modification)

FIG. 7 is a plan view schematically illustrating an array pattern of common electrodes and pixel electrodes according to a first modification. FIGS. 8A and 8B are plan views illustrating a common electrode and a pixel electrode for one pixel of the array pattern according to the first modification.

As illustrated in the drawings, in the first modification, a plurality of common electrodes CE continuously arranged in the first direction X and the second direction Y each have a rectangular shape, for example, a substantially square shape in plan view. A through hole CH1 is provided in each common electrode CE. Further, each common electrode CE has, for example, a rectangular opening OP1 in a central portion thereof. Thus, each common electrode CE is formed in a rectangular annular shape in plan view.

A plurality of pixel electrodes PE are arrayed in a two-dimensional matrix at predetermined intervals in the first direction X and the second direction Y, and are arranged to overlap the common electrodes CE respectively in the third direction Z. In one example, each pixel electrode PE is formed in a rectangular shape, for example, a square shape. The pixel electrode PE is formed to have a size smaller than one pixel region of the common electrode CE and larger than the opening OP1. The pixel electrode PE is arranged in a state in which the substantial center thereof coincides with the center of the common electrode CE, and covers the common electrode CE. In one pixel PX, the four sides of the pixel electrode PE are shifted toward the center side from the four outer sides of the common electrode CE, and are positioned outside the four sides of the opening OP1. That is, in plan view, the peripheral edge portion of the pixel electrode PE overlaps the common electrode CE, and the peripheral edge portion of the common electrode CE is located outside the pixel electrode PE without overlapping the pixel electrode PE.

Each pixel electrode PE is connected to the semiconductor layer SC through the corresponding through hole CH1 of the common electrode CE.

As described above, the first capacitance C1 is formed between each pixel electrode PE and the common electrode CE. As described above, by providing the opening OP1 in the common electrode CE, the capacitance value of the capacitance C1 can be arbitrarily set. The opening OP1 is not limited to a rectangular shape, and various other shapes can be selected. In addition, the area of the region where the common electrode CE and the pixel electrode PE overlap each other is not limited to a case of being equal in the first direction X and the second direction Y, and can be arbitrarily changed.

(Second Modification)

Figure 9:
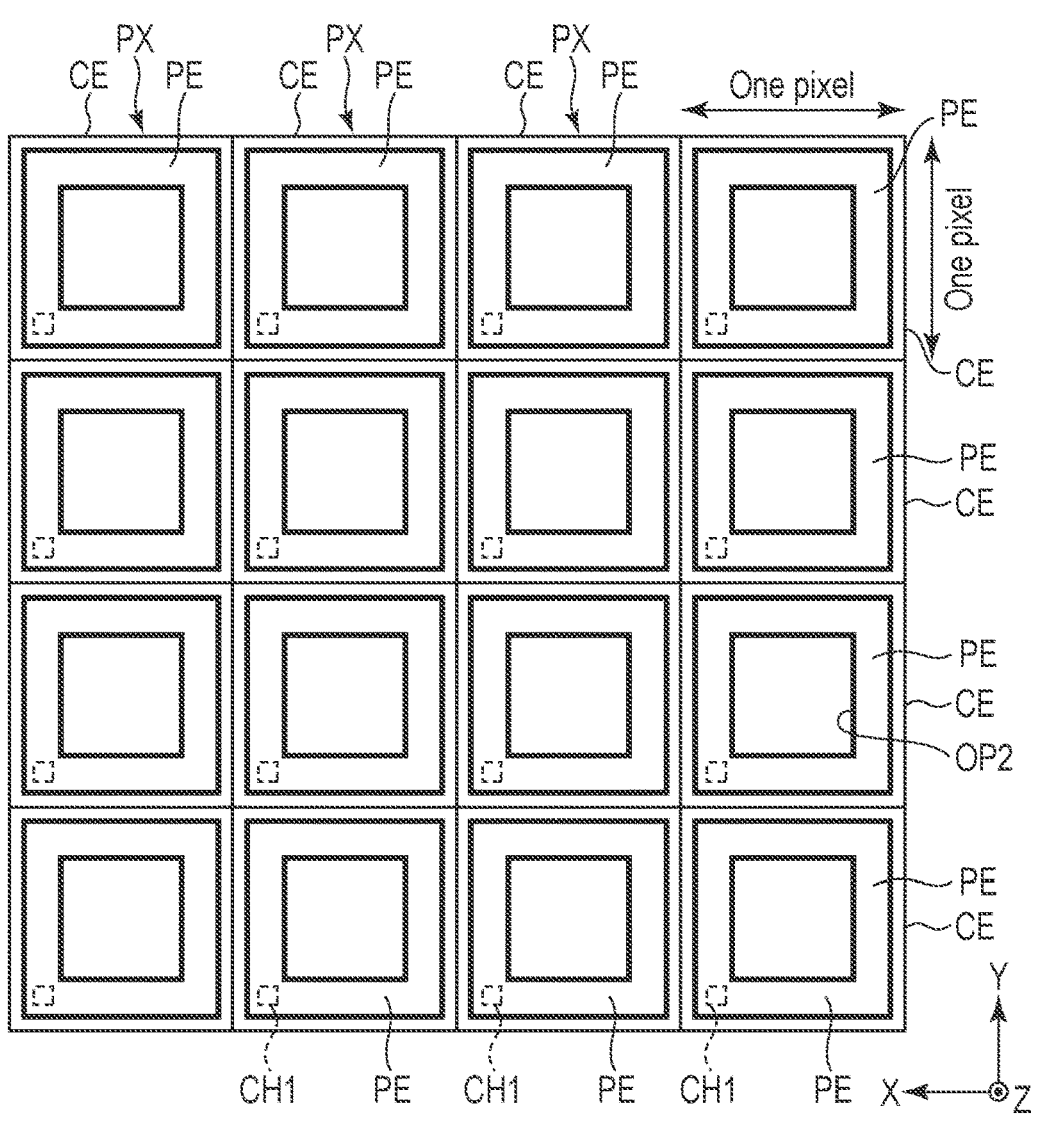
FIG. 9 is a plan view schematically illustrating an array pattern of common electrodes and pixel electrodes according to a second modification.
Figures 10A, 10B:
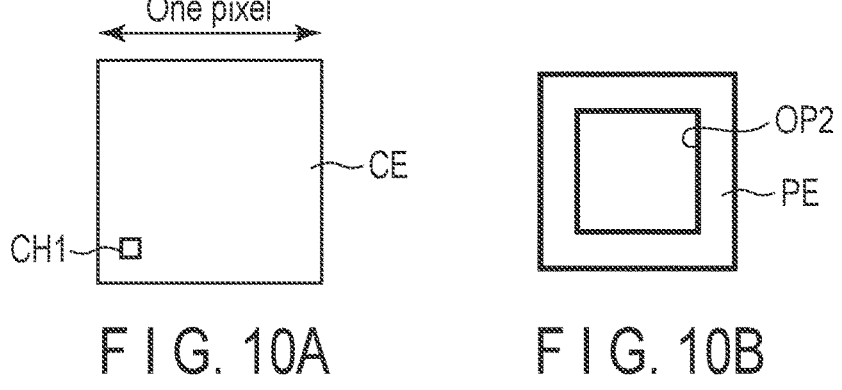
FIG. 10A is a plan view illustrating the common electrode for one pixel of the array pattern according to the second modification.
FIG. 10B is a plan view showing the pixel electrode for one pixel of the array pattern according to the second modification.

FIG. 9 is a plan view schematically illustrating an array pattern of common electrodes and pixel electrodes according to a second modification. FIGS. 10A and 10B are plan views illustrating a common electrode and a pixel electrode for one pixel of the array pattern according to the second modification.

As illustrated in the drawings, in the second modification, a plurality of common electrodes CE continuously arranged in the first direction X and the second direction Y each have a rectangular shape, for example, a substantially square shape in plan view. A through hole CH1 is provided in each common electrode CE.

A plurality of pixel electrodes PE are arrayed in a two-dimensional matrix at predetermined intervals in the first direction X and the second direction Y, and are arranged to overlap the common electrodes CE respectively in the third direction Z. In one example, each pixel electrode PE is formed in a rectangular shape, for example, a square shape. Each pixel electrode PE has, for example, a rectangular opening OP2 in a central portion thereof. As a result, the pixel electrode PE is formed in a rectangular annular shape in plan view.

The pixel electrode PE is formed to have a size smaller than one pixel region of the common electrode CE. The pixel electrode PE is arranged in a state where the substantial center thereof coincides with the center of the common electrode CE, and overlaps the common electrode CE. In one pixel PX, the four outer sides of the pixel electrode PE are shifted toward the center from the four sides of the common electrode CE. That is, in plan view, the peripheral edge portion of the common electrode CE is located outside the pixel electrode PE without overlapping the pixel electrode PE.

Each pixel electrode PE is connected to the semiconductor layer SC through the corresponding through hole CH1 of the common electrode CE.

As described above, the first capacitance C1 is formed between each pixel electrode PE and the common electrode CE. By providing the opening OP2 in the pixel electrode PE, the capacitance value of the capacitance C1 can be arbitrarily set. Although the electric field near the center of the pixel electrode PE may be weakened depending on the size of the pixel, it is possible to increase the intensity of the electric field generated near the center by providing the opening OP2 in the central portion of the pixel electrode PE as described above. The opening OP2 is not limited to a rectangular shape, and various other shapes can be selected.

(Third Modification)

FIG. 11 is a plan view schematically illustrating an array pattern of common electrodes and pixel electrodes according to a third modification. FIGS. 12A and 12B are plan views illustrating a common electrode and a pixel electrode for one pixel of the array pattern according to the third modification.

As illustrated in the drawings, in the third modification, a plurality of common electrodes CE continuously arranged in the first direction X and the second direction Y each have a rectangular shape, for example, a substantially square shape in plan view. A through hole CH1 is provided in each common electrode CE. Further, the common electrode CE has, for example, a rectangular annular opening OP1. Thus, each common electrode CE has an outer peripheral portion CE1 formed in a rectangular annular shape in plan view, and a rectangular central portion CE2 located inside the outer peripheral portion CE1. The outer peripheral portion CE1 and the central portion CE2 are electrically connected to each other by a wiring of the lower layer (not illustrated).

A plurality of pixel electrodes PE are arrayed in a two-dimensional matrix at predetermined intervals in the first direction X and the second direction Y, and are arranged to overlap the common electrodes CE respectively in the third direction Z. Each pixel electrode PE is formed in a rectangular shape, for example, a square shape. The pixel electrode PE has, for example, a rectangular opening OP2 in a central portion thereof. As a result, the pixel electrode PE is formed in a rectangular annular shape in plan view.

The outer dimension of the pixel electrode PE is smaller than the outer dimension of the outer peripheral portion CE1 of the common electrode CE and larger than the inner dimension of the outer peripheral portion CE1. The inner dimension of the pixel electrode PE, that is, the outer dimension of the opening OP2 is smaller than the dimension of the central portion CE2 of the common electrode CE. The pixel electrode PE is arranged in a state where the substantial center thereof coincides with the center of the common electrode CE, and overlaps the common electrode CE. In one pixel PX, the four outer sides of the pixel electrode PE are shifted toward the center side from the four outer sides of the common electrode CE, and are positioned outside the four outer sides of the opening OP1. The four inner sides of the pixel electrode PE are shifted toward the center side from the four sides of the central portion CE2 of the common electrode CE. That is, in plan view, the pixel electrode PE covers the opening OP1 of the common electrode CE. The outer peripheral edge portion of the pixel electrode PE overlaps the outer peripheral portion CE1 of the common electrode CE, and the inner peripheral edge portion of the pixel electrode PE overlaps the central portion CE2. The outer peripheral edge portion of the common electrode CE is located outside the pixel electrode PE without overlapping the pixel electrode PE.

Each pixel electrode PE is connected to the semiconductor layer SC through the corresponding through hole CH1 of the common electrode CE.

As described above, by providing the openings OP2 and OP1 in the pixel electrode PE and the common electrode, the capacitance value of the capacitance C1 can be arbitrarily set. In addition, by providing the opening OP2 in the central portion of the pixel electrode PE, the intensity of the electric field generated near the center can be increased.

The shapes of the openings OP1 and OP2 are not limited to a rectangular shape, and various other shapes can be selected.

The outer peripheral portion CE1 and the central portion CE2 in the common electrode CE are not limited to be connected by the wiring of the lower layer, and may be connected by a thin line pattern P1 in the same layer as the common electrode CE as illustrated in FIG. 13, for example.

(Fourth Modification)

FIG. 14 is a plan view schematically illustrating an array pattern of common electrodes and pixel electrodes according to a fourth modification. FIGS. 15A and 15B are plan views illustrating a common electrode and a pixel electrode for one pixel of the array pattern according to the fourth modification.

As illustrated in the drawings, in the fourth modification, a plurality of common electrodes CE continuously arranged in the first direction X and the second direction Y each have a rectangular shape, for example, a substantially square shape in plan view. The common electrode CE has, for example, two rectangular annular openings OP1a and OP1b. Thus, each common electrode CE includes an outer peripheral portion CE1 formed in a rectangular annular shape in plan view, a rectangular annular intermediate portion CE3 located inside the outer peripheral portion CE1, and a rectangular central portion CE2 located inside the intermediate portion CE3. The outer peripheral portion CE1, the intermediate portion CE3, and the central portion CE2 are electrically connected to each other by a wiring of the lower layer described later.

A plurality of pixel electrodes PE are arrayed in a two-dimensional matrix at predetermined intervals in the first direction X and the second direction Y, and are arranged to overlap the common electrodes CE respectively in the third direction Z. Each pixel electrode PE is formed in a rectangular shape, for example, a square shape. The pixel electrode PE has, for example, a rectangular annular opening OP2a and a rectangular opening OP2b. As a result, the pixel electrode PE has an outer peripheral portion PEO formed in a rectangular annular shape in plan view, and a rectangular annular central portion PEC located inside the outer peripheral portion PEO. The outer peripheral portion PEO and the central portion PEC are electrically connected to each other by a wiring of the lower layer to be described later.

The outer dimension of the outer peripheral portion PEO of the pixel electrode PE is smaller than the outer dimension of the outer peripheral portion CE1 of the common electrode CE and larger than the inner dimension of the outer peripheral portion CE1. The inner dimension of the outer peripheral portion PEO, that is, the outer dimension of the opening OP2a is smaller than the outer dimension of the intermediate portion CE3 of the common electrode CE. The outer dimension of the central portion PEC of the pixel electrode PE is smaller than the outer dimension of the intermediate portion CE3 of the common electrode CE, and is larger than the inner dimension of the intermediate portion CE3. The inner dimension of the central portion PEC, that is, the outer dimension of the opening OP2b is smaller than the outer dimension of the central portion CE2 of the common electrode CE.

The pixel electrode PE is arranged in a state where the substantial center thereof coincides with the center of the common electrode CE, and overlaps the common electrode CE. In one pixel PX, the four outer sides of the pixel electrode PE are shifted toward the center side from the four outer sides of the common electrode CE, and are positioned outside the four outer sides of the opening OP1a. The four inner sides of the outer peripheral portion PEO of the pixel electrode PE are shifted toward the center side from the four outer sides of the intermediate portion CE3 of the common electrode CE. In plan view, the outer peripheral portion PEO of the pixel electrode PE covers the opening OP1a of the common electrode CE. The outer peripheral edge portion of the outer peripheral portion PEO overlaps the outer peripheral portion CE1 of the common electrode CE, and the inner peripheral edge portion of the outer peripheral portion PEO overlaps the intermediate portion CE3. The outer peripheral edge portion of the common electrode CE is located outside the pixel electrode PE without overlapping the pixel electrode PE.

In plan view, the four outer sides of the central portion PEC of the pixel electrode PE are shifted toward the center side from the four outer sides of the intermediate portion CE3 of the common electrode CE, and are positioned outside the four outer sides of the opening OP1b. The four inner sides of the central portion PEC are shifted toward the center side from the four outer sides of the central portion CE2 of the common electrode CE. As a result, in plan view, the central portion PEC of the pixel electrode PE covers the opening OP1b of the common electrode CE. The outer peripheral edge portion of the central portion PEC overlaps the intermediate portion CE3 of the common electrode CE, and the inner peripheral edge portion of the central portion PEC overlaps the central portion CE2. The opening OP2b of the pixel electrode PE faces the central portion CE2 of the common electrode CE.

As described above, by providing the openings OP2 and OP1 in the pixel electrode PE and the common electrode, the capacitance value of the capacitance C1 can be arbitrarily set. By providing the openings OP2a and OP2b in the pixel electrode PE, the intensity of the electric field generated near the center of the pixel electrode PE can be increased.

The openings OP1 and OP2 are not limited to a rectangular shape or a rectangular annular shape, and various other shapes can be selected. The pixel electrode PE has a double annular shape, but is not limited thereto, and may have a triple or more annular shape, or may have a shape without the central opening OP2b. In the common electrode CE and the pixel electrode PE, the pattern line widths may not be the same on the inner side/the outer side, the upper side, the lower side, the left side, and the right side.

Furthermore, the shape of the common electrode CE can be changed according to a necessary capacitance value, and for example, as illustrated in FIG. 16, the area facing the pixel electrode PE may be increased by omitting the opening OP1a and integrating the outer peripheral portion CE1 and the intermediate portion.

Next, an example of a connection structure of the pixel electrode PE and the common electrode CE will be disclosed.

Figures 17, 18:
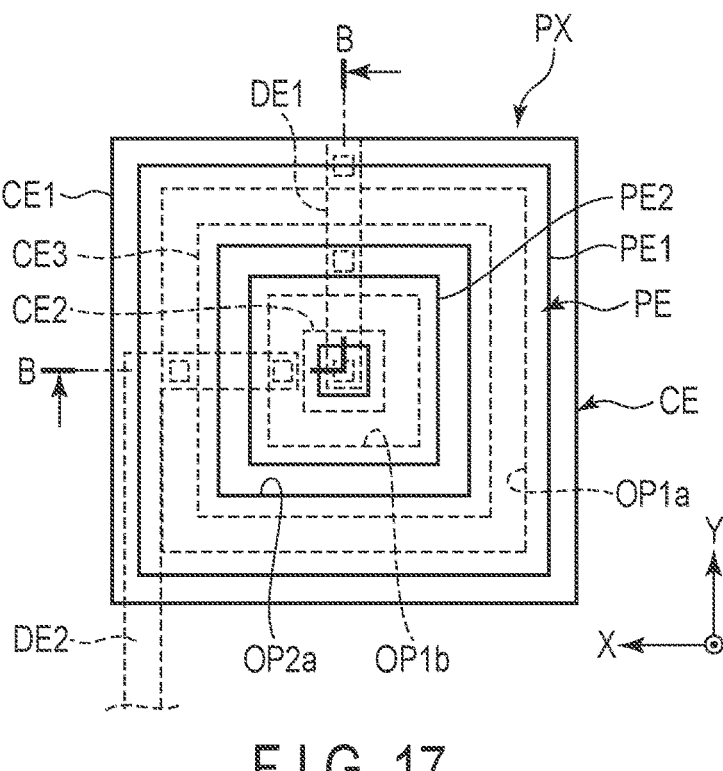
FIG. 17 is an enlarged plan view illustrating the pixel electrode and the common electrode for one pixel according to the fourth modification.
FIG. 18 is a cross-sectional view of an array substrate taken along line B-B in FIG. 17.

FIG. 17 is an enlarged plan view illustrating the pixel electrode PE and the common electrode CE for one pixel in the fourth modification. FIG. 18 is a cross-sectional view of the array substrate taken along line B-B in FIG. 17.

As illustrated, the common electrode CE, the insulating layer 13, and the pixel electrode PE are provided on the insulating layer 12. The insulating layer 13 is provided on the common electrode CE and covers the common electrode CE and the openings OP1a and OP1b. The upper surface of the insulating layer 13 is flat, and the pixel electrode PE is provided on the upper surface of the insulating layer 13.

The outer peripheral portion CE1, the intermediate portion CE3, and the central portion CE2 of the common electrode CE are connected to a drain DE1 of the semiconductor layer SC through through holes CH3 provided in the insulating layer 12. The drain DE1 is connected to a common voltage wiring Vcom through the insulating layer 11. As described above, the outer peripheral portion CE1, the intermediate portion CE3, and the central portion CE2 of the common electrode CE are electrically connected to each other by the drain DE1, and are electrically connected to the common voltage wiring Vcom.

The outer peripheral portion PEO and the central portion PEC of the pixel electrode PE are connected to a drain DE2 of the semiconductor layer SC through through holes CH4 provided in the insulating layers 12 and 13 and the opening OP1a or the opening OP1b of the common electrode CE, respectively. As a result, the outer peripheral portion PEO and the central portion PEC are electrically connected to each other via the drain DE2, and are electrically connected to the drain of the transistor Tr.

The connection of the outer peripheral portion CE1, the intermediate portion CE3, and the central portion CE2 in the common electrode CE is not limited to be connected by the wiring of the lower layer, and may be connected by a thin line pattern of the same layer as the common electrode CE. Similarly, the connection between the outer peripheral portion PEO and the central portion PEC in the pixel electrode PE is not limited to the wiring of the lower layer, and may be connected by a thin line pattern in the same layer as the pixel electrode PE.

(Fifth Modification)

Figure 19:
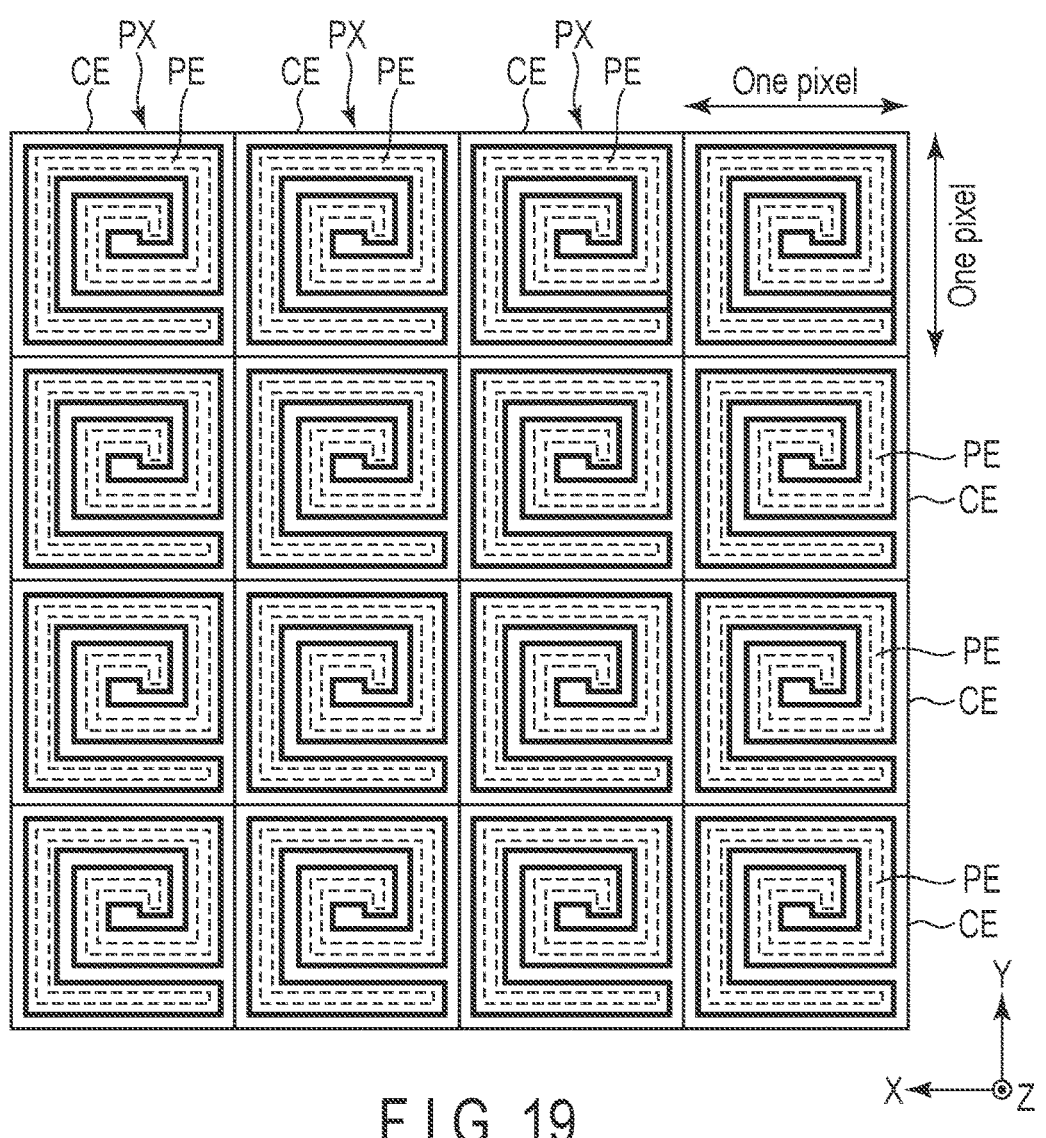
FIG. 19 is a plan view schematically illustrating an array pattern of common electrodes and pixel electrodes according to a fifth modification.
Figures 20A, 20B:
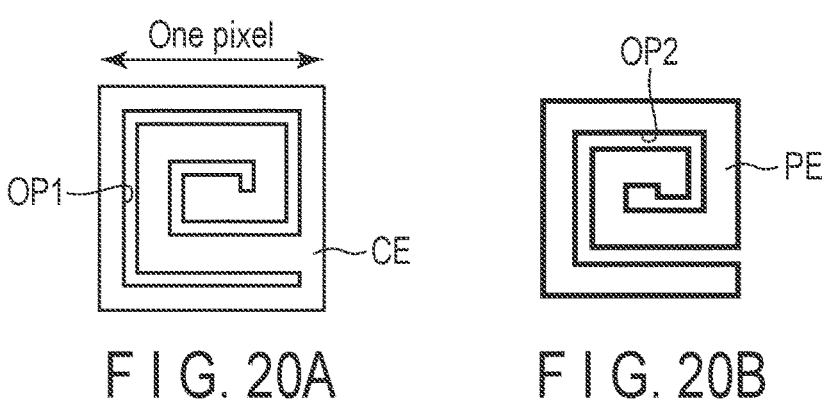
FIG. 20A is a plan view illustrating the common electrode for one pixel of the array pattern according to the fifth modification.
FIG. 20B is a plan view showing the pixel electrode for one pixel of the array pattern according to the fifth modification.

FIG. 19 is a plan view schematically illustrating an array pattern of common electrodes and pixel electrodes according to a fifth modification. FIGS. 20A and 20B are plan views illustrating a common electrode and a pixel electrode for one pixel of the array pattern according to the fifth modification.

As illustrated in the drawings, in the fifth modification, a plurality of common electrodes CE continuously arranged in the first direction X and the second direction Y each have a rectangular shape, for example, a substantially square shape in plan view. The common electrode CE has an opening OP1 or a slit formed in a spiral shape. The opening OP1 is bent and extends in a substantially rectangular shape from the outer peripheral edge portion of the common electrode CE toward the center. Thus, the common electrode CE has a spiral pattern corresponding to the opening OP1. The common electrode CE is conductive over the entire region without being electrically divided by the opening OP1.

A plurality of pixel electrodes PE are arrayed in a two-dimensional matrix at predetermined intervals in the first direction X and the second direction Y, and are arranged to overlap the common electrodes CE respectively in the third direction Z. Each pixel electrode PE is formed in a rectangular shape, for example, a square shape. The pixel electrode PE has an opening OP2 or a slit formed in a spiral shape. The opening OP2 is bent and extends in a substantially rectangular shape from the outer peripheral edge portion of the pixel electrode PE toward the center. As a result, the pixel electrode PE has a spiral pattern corresponding to the opening OP2. The pixel electrode PE is conductive over the entire region without being electrically divided.

The outer dimension of the pixel electrode PE is smaller than the outer dimension of the common electrode CE and larger than the outer dimension of the opening OP1. The width of each part of the pixel electrode PE is larger than the width of each part of the opening OP1. The pixel electrode PE is arranged in a state where the substantial center thereof coincides with the center of the common electrode CE, and overlaps the common electrode CE. In plan view, the pixel electrode PE covers the opening OP1a of the common electrode CE. Both ends in the width direction of each part of the pixel electrode PE overlap the common electrode CE. At the same time, the opening OP2 of the pixel electrode PE faces the common electrode CE. The outer peripheral edge portion of the common electrode CE is located outside the pixel electrode PE without overlapping the pixel electrode PE.

As described above, by providing the openings OP2 and OP1 in the pixel electrode PE and the common electrode, the capacitance value of the capacitance C1 can be arbitrarily set. By providing the opening OP2 in the pixel electrode PE, the intensity of the electric field generated near the center of the pixel electrode PE can be increased. By making the openings OP1 and OP2 spiral, the common electrode CE can be a continuous electrode without being divided, and similarly, the pixel electrode PE can also be a continuous electrode.

The shape of the openings OP1 and OP2 is not limited to a rectangular spiral shape, and various other shapes can be selected. In the common electrode CE and the pixel electrode PE, the pattern line width may not be constant or identical. For example, the pattern line width may be increased or decreased toward the center of the electrode. In the fifth modification, for example, as illustrated in FIG. 21, the common electrode CE may be a solid electrode having only the through hole CH1.

(Sixth Modification)

FIG. 22 is a plan view schematically illustrating an array pattern of common electrodes and pixel electrodes according to a sixth modification. FIGS. 23A and 23B are plan views illustrating a common electrode and a pixel electrode for one pixel of the array pattern according to the sixth modification.

As illustrated in the drawings, in the sixth modification, a plurality of common electrodes CE continuously arranged in the first direction X and the second direction Y each have a rectangular shape, for example, a substantially square shape in plan view. The common electrode CE has a plurality of openings OP1, for example, nine openings OP1. The openings OP1 are formed in, for example, rectangular shapes having the same dimension, and are arranged in three rows and three columns at intervals in the first direction X and the second direction Y.

A plurality of pixel electrodes PE are arrayed in a two-dimensional matrix at predetermined intervals in the first direction X and the second direction Y, and are arranged to overlap the common electrodes CE respectively in the third direction Z. The pixel electrode PE for one pixel includes a plurality of divisional electrodes PE1. The plurality of, for example, nine divisional electrodes PE1 are formed in, for example, a rectangular shape, and are arranged in three rows and three columns at intervals in the first direction X and the second direction Y. In one example, the nine divisional electrodes PE1 are formed to have the same dimension, and such dimension is larger than that of the openings OP1 of the common electrode CE.

Each of the divisional electrodes PE1 is arranged in a state where the substantial center thereof coincides with the opening OP1 of the common electrode CE, and overlaps the common electrode CE. In plan view, the divisional electrode PE1 covers the opening OP1 of the common electrode CE. The peripheral edge portion of the divisional electrode PE1 overlaps the common electrode CE. The outer peripheral edge portion of the common electrode CE is located outside the divisional electrodes PE1 without overlapping the divisional electrodes PE1.

The nine divisional electrodes PE1 are electrically connected to each other via a wiring of the lower layer (not illustrated) or the like.

As described above, according to the sixth modification, the capacitance value of the capacitance C1 can be arbitrarily set by providing the openings OP1 in the common electrode or by dividing the pixel electrode PE into the plurality of divisional electrodes PE1. By dividing the pixel electrode PE into a plurality of parts, the electric field intensity can be made uniform over the entire region of the pixel electrode PE.

The openings OP1 and the divisional electrodes PE1 are not limited to a rectangular shape, and various other shapes can be selected. The divisional electrodes PE1 are not limited to the same size, and may be divisional electrodes having different sizes. That is, the area of the overlapping region between the divisional electrodes PE1 and the common electrode CE is not limited to be uniform, and may be different from each other depending on the location. In the sixth modification, the number of openings OP1 and divisional electrodes PE1 is not limited to nine (three rows and three columns), and may be two rows and two columns or four rows and four columns.

(Seventh Modification)

FIG. 24 is a plan view schematically illustrating an array pattern of common electrodes and pixel electrodes according to a seventh modification. FIGS. 25A and 25B are plan views illustrating a common electrode and a pixel electrode for one pixel of the array pattern according to the seventh modification.

As illustrated in the drawings, in the seventh modification, a plurality of common electrodes CE continuously arranged in the first direction X and the second direction Y each have a rectangular shape, for example, a substantially square shape in plan view. The common electrode CE has a plurality of openings OP1, for example, eight openings OP1. The openings OP1 are formed in, for example, rectangular shapes having the same dimension, and are arranged in four rows and two columns at intervals in a staggered manner in the first direction X and the second direction Y.

A plurality of pixel electrodes PE are arrayed in a two-dimensional matrix at predetermined intervals in the first direction X and the second direction Y, and are arranged to overlap the common electrodes CE respectively in the third direction Z. The pixel electrode PE for one pixel includes a plurality of divisional electrodes PE'. The plurality of, for example, eight divisional electrodes PE1 are formed in, for example, a rectangular shape, and are arranged in four rows and two columns at intervals in a staggered manner in the first direction X and the second direction Y. In one example, the eight divisional electrodes PE1 are formed to have the same dimension and such dimension is larger than that of the openings OP1 of the common electrode CE.

Each of the divisional electrodes PE1 is arranged in a state where the substantial center thereof coincides with the opening OP1 of the common electrode CE, and overlaps the common electrode CE. In plan view, the divisional electrode PE1 covers the opening OP1 of the common electrode CE. The peripheral edge portion of the divisional electrode PE1 overlaps the common electrode CE. The outer peripheral edge portion of the common electrode CE is located outside the divisional electrodes PE1 without overlapping the divisional electrodes PE1.

The eight divisional electrodes PE1 are electrically connected to each other via a wiring of the lower layer (not illustrated) or the like.

As described above, according to the seventh modification, the capacitance value of the capacitance C1 can be arbitrarily set by providing the openings OP1 in the common electrode or by dividing the pixel electrode PE into the plurality of divisional electrodes PE1. By dividing the pixel electrode PE into a plurality of parts, the electric field intensity can be made uniform over the entire region of the pixel electrode PE.

The openings OP1 and the divisional electrodes PE1 are not limited to a rectangular shape, and various other shapes can be selected. The divisional electrodes PE1 are not limited to the same size, and may be divisional electrodes having different sizes. In the seventh modification, the number of openings OP1 and divisional electrodes PE1 is not limited to eight (four rows and two columns), and may be three rows and two columns or four rows and three columns.

As illustrated in FIG. 26, a plurality of divisional electrodes PE1 may be in contact with each other in one pixel as a pixel electrode.

(Eighth Modification)

FIG. 27 is a plan view schematically illustrating an array pattern of common electrodes and pixel electrodes according to an eighth modification. FIGS. 28A and 28B are plan views illustrating a common electrode and a pixel electrode for one pixel of an array pattern according to the eighth modification.

As illustrated in the drawings, in the eighth modification, a plurality of common electrodes CE continuously arranged in the first direction X and the second direction Y each have a rectangular shape, for example, a substantially square shape in plan view. The common electrode CE has a plurality of openings OP1, for example, eight openings OP1. The openings OP1 are formed in, for example, rectangular shapes having the same dimension, and are arranged in four rows and two columns at intervals in a staggered manner in the first direction X and the second direction Y.

A plurality of pixel electrodes PE are arrayed in a two-dimensional matrix at predetermined intervals in the first direction X and the second direction Y, and are arranged to overlap the common electrodes CE respectively in the third direction Z. The pixel electrode PE for one pixel includes a plurality of divisional electrodes PE1. The plurality of, for example, eight divisional electrodes PE1 are formed in, for example, a circular shape, and are arranged in four rows and two columns at intervals in a staggered manner in the first direction X and the second direction Y. In one example, the eight divisional electrodes PE1 are formed to have the same dimension and have an outer dimension larger than that of the openings OP1 of the common electrode CE.

Each of the divisional electrodes PE1 is arranged in a state where the substantial center thereof coincides with the opening OP1 of the common electrode CE, and overlaps the common electrode CE. In plan view, the divisional electrode PE1 covers the opening OP1 of the common electrode CE. The peripheral edge portion of the divisional electrode PE1 overlaps the common electrode CE. The outer peripheral edge portion of the common electrode CE is located outside the divisional electrodes PE1 without overlapping the divisional electrodes PE1.

The eight divisional electrodes PE1 are electrically connected to each other via a wiring of the lower layer (not illustrated) or the like.

As described above, according to the eighth modification, the capacitance value of the capacitance C1 can be arbitrarily set by providing the openings OP1 in the common electrode or by dividing the pixel electrode PE into the plurality of divisional electrodes PE1. By dividing the pixel electrode PE into a plurality of parts, the electric field intensity can be made uniform over the entire region of the pixel electrode PE.

The openings OP1 are not limited to a rectangular shape, and various other shapes can be selected. The divisional electrodes PE1 are not limited to a circular shape, and various other shapes can be selected. The divisional electrodes PE1 are not limited to the same dimension and the same shape, and may be divisional electrodes having different dimensions or shapes. The area of the overlapping region of the divisional electrode PE1 and the common electrode CE is not limited to be uniform, and may be different from each other depending on the location. The number of the openings OP1 and the number of the divisional electrodes PE1 are not limited to eight, and can be variously selected.

Figures 29A, 29B, 30:
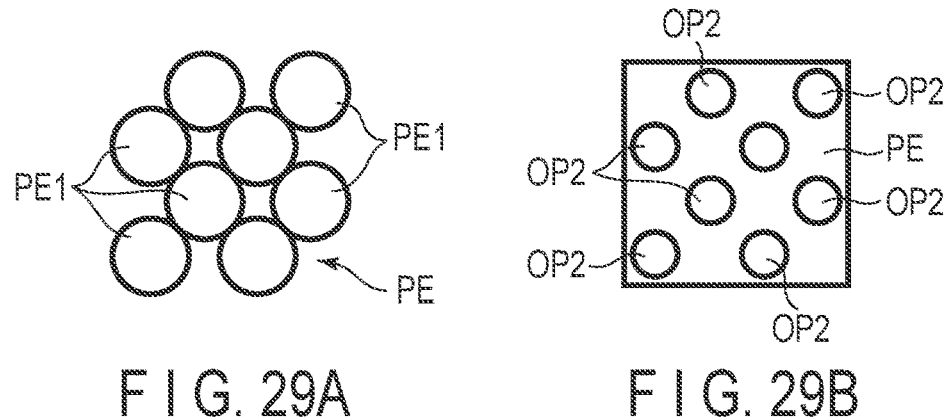
FIG. 29A is a plan view showing another example of the pixel electrode for one pixel in the eighth modification.
FIG. 29B is a plan view showing another example of the pixel electrode for one pixel in the eighth modification.
FIG. 30 is a plan view schematically illustrating an array pattern of common electrodes and pixel electrodes according to a ninth modification.

FIGS. 29A and 29B are plan views each illustrating another modification of the pixel electrode in the eighth embodiment.

As illustrated in FIG. 29A, in one pixel, a plurality of divisional electrodes PE1 may be in contact with each other as a pixel electrode. Alternatively, as illustrated in FIG. 29B, the pixel electrode PE may be a rectangular electrode, and a plurality of circular openings OP2 arranged in a staggered manner may be provided.

(Ninth Modification)

FIG. 30 is a plan view schematically illustrating an array pattern of common electrodes and pixel electrodes according to a ninth modification. FIGS. 31A and 31B are plan views illustrating a common electrode and a pixel electrode for one pixel of the array pattern according to the ninth modification.

As illustrated in the drawings, according to the ninth modification, a plurality of common electrodes CE continuously arranged in the first direction X and the second direction Y each have a rectangular shape, for example, a substantially square shape in plan view. In one pixel, the common electrode CE has a plurality of openings OP1, for example, seven openings OP1. The common electrode CE further includes a plurality of openings OP1, for example, two openings OP1 provided on a boundary between two pixels adjacent in the first direction X. These openings OP1 are formed in, for example, rectangular shapes having the same dimension, and are arranged in three rows and three columns at intervals in a staggered manner in the first direction X and the second direction Y.

A plurality of pixel electrodes PE are arrayed in a two-dimensional matrix at predetermined intervals in the first direction X and the second direction Y, and are arranged to overlap the common electrodes CE respectively in the third direction Z. The pixel electrode PE for one pixel is divided into a plurality of divisional electrodes PE1. The plurality of, for example, nine divisional electrodes PE1 are formed in, for example, a circular shape, and are arranged in three rows and three columns at intervals in a staggered manner in the first direction X and the second direction Y. In one example, the nine divisional electrodes PE1 are formed to have the same dimension and have an outer dimension larger than the openings OP1 of the common electrode CE.

Each of the divisional electrodes PE1 is arranged in a state where the substantial center thereof coincides with the opening OP1 of the common electrode CE, and overlaps the common electrode CE. In plan view, the divisional electrode PE1 covers the opening OP1 of the common electrode CE. The peripheral edge portion of the divisional electrode PE1 overlaps the common electrode CE. The two divisional electrodes PE1 are disposed so as to cover the openings OP1 located on the boundary. The nine divisional electrodes PE1 are electrically connected to each other via a wiring of the lower layer (not illustrated) or the like.

As described above, according to the ninth modification, the capacitance value of the capacitance C1 can be arbitrarily set by providing the openings OP1 in the common electrode or by dividing the pixel electrode PE into the plurality of divisional electrodes PE1. By dividing the pixel electrode PE into a plurality of parts, the electric field intensity can be made uniform over the entire region of the pixel electrode PE. Furthermore, by providing the divisional electrodes PE1 on the boundary between two adjacent pixels, it is possible to improve the magnetic field intensity over the entire region of the pixels.

The openings OP1 are not limited to a rectangular shape, and various other shapes can be selected. The divisional electrodes PE1 are not limited to a circular shape, and various other shapes can be selected. The divisional electrodes PE1 are not limited to the same dimension and the same shape, and may be divisional electrodes having different dimensions or shapes. The area of the overlapping region of the divisional electrode PE1 and the common electrode CE is not limited to be uniform, and may be different from each other depending on the location. The number of the openings OP1 and the number of the divisional electrodes PE1 are not limited to nine, and can be variously increased or decreased. Further, the plurality of divisional electrodes PE1 may be in contact with each other in one pixel.

FIG. 32 is a plan view illustrating another modification of the pixel electrode in the ninth modification.

As illustrated in the drawing, the pixel electrode PE may be a rectangular electrode, and a plurality of openings OP2 arranged in a staggered manner may be provided. That is, the pixel electrode PE may have a negative/positive electrode shape inverted from the electrode shown in FIG. 31B.

Next, an electrophoretic display device according to other embodiments will be described. Note that, in the other embodiments described below, the same components as those of the first embodiment described above are denoted by the same reference numerals as those of the first embodiment, and detailed description thereof may be omitted or simplified.

Second Embodiment

FIG. 33 is a schematic cross-sectional view of a display panel included in a display device according to a second embodiment.

According to the second embodiment, a display panel PNL further includes a counter-electrode TE provided on a counter-substrate CT.

Specifically, as illustrated in FIG. 33, the display panel PNL of the electrophoretic display device includes an array substrate AR, a counter-substrate CT facing the array substrate AR in the third direction Z, and an electrophoretic layer disposed between the array substrate AR and the counter-substrate CT.

The array substrate AR is configured similarly to the array substrate AR in the first embodiment described above. That is, the array substrate AR includes a first base material 10. A conductive layer is provided on one surface of the first base material 10, and the conductive layer is patterned to form the scanning lines G. An insulating layer 11, a semiconductor layer SC, and an insulating layer 12 are sequentially laminated on the surface of the first base material 10. The insulating layer 11 covers the scanning lines G. The semiconductor layer SC is disposed on the insulating layer 11. The insulating layer 12 covers the semiconductor layer SC and the insulating layer 11.

A common electrode CE, an insulating layer 13, and a plurality of pixel electrodes PE are provided on the insulating layer 12. The common electrode CE covers almost the entire surface of the insulating layer 12. The common electrode CE has a plurality of through holes CH1 facing the pixel electrodes. The insulating layer 13 is provided on the common electrode CE and covers the common electrode CE and the through holes CH1. The upper surface of the insulating layer 13 is flat and substantially parallel to the upper surface of the first base material 10. The plurality of pixel electrodes PE are provided on the upper surface of the insulating layer 13, and are arrayed in a matrix in the first direction X and the second direction Y. Each pixel electrode PE is connected to a drain DE of the semiconductor layer SC through the through hole CH1 and a through hole CH2 formed in the insulating layer 12 and the insulating layer 13.

The counter-substrate CT includes a second base material 14. The lower surface of the second base material 14 is flat and faces the array substrate AR substantially in parallel with a predetermined gap. In the second embodiment, a counter-electrode TE is provided on the lower surface of the counter-substrate CT, and faces an electrophoretic layer DL. The counter-electrode TE is disposed at a position not overlapping the pixel electrodes PE in the third direction Z, and is formed in a shape not overlapping the pixel electrodes PE. In one example, as described later, the counter-electrode TE is formed in a lattice shape, and is disposed at a position facing a boundary region between the pixels.

The counter-electrode TE is made of a transparent conductive material such as indium tin oxide (ITO) and indium zinc oxide (IZO).

FIG. 34A illustrates an equivalent circuit of one pixel applicable to the display panel PNL. As illustrated, each pixel PX of the display panel PNL includes a transistor Tr, a first capacitance C1, a second capacitance C2, the pixel electrode PE, the common electrode CE, and the counter-electrode TE. The pixel electrode PE and the common electrode CE are provided on the array substrate AR, and the counter-electrode TE is provided on the counter-substrate CT.

The transistor Tr is formed of, for example, a P-channel thin film transistor (TFT). The transistor Tr includes a first electrode E1, a second electrode E2, and a gate electrode GE. In the transistor Tr, the first electrode E1 is connected to the signal line S, the second electrode E2 is connected to the pixel electrode PE, and the gate electrode GE is connected to the scanning line G. As a result, the transistor Tr is switched to a conductive state or a non-conductive state by a scanning signal SG provided to the scanning line G. An image signal Vsig is supplied to the pixel electrode PE via the signal line S and the transistor Tr in the conductive state. A common voltage Vcom is supplied to the common electrode CE.

The counter-electrode TE is connected to the common electrode CE via a wiring (not illustrated) or the like extending through a sealing member. As a result, the common voltage Vcom is supplied to the counter-electrode TE.

The first capacitance C1 is formed between the pixel electrode PE and the common electrode CE. The second capacitance C2 is formed between the pixel electrode PE and the counter-electrode TE. The potential of the image signal Vsig supplied to the pixel electrode PE is held by the first capacitance C1 and the second capacitance C2.

FIG. 34B illustrates an equivalent circuit of one pixel according to a modification. As illustrated in the drawing, a voltage Vcom2 independent from the common electrode CE may be supplied to the counter-electrode TE. By supplying the voltage Vcom2 of the counter-electrode TE independently of the voltage Vcom of the common electrode CE, each of the electric field formed between the counter-electrode TE and the pixel electrode PE and the electric field formed between the common electrode CE and the pixel electrode PE can be efficiently generated. As a result, the responsiveness of the display function layer DL is improved, and the image can be displayed more clearly.

FIG. 35 is a plan view illustrating an example of a counter-electrode. FIG. 36 is a plan view illustrating an example of a common electrode and a pixel electrode for one pixel.

As illustrated in FIG. 36, when the pixel electrode PE has a rectangular shape, for example, a square shape, the counter-electrode TE is formed in a shape not overlapping pixel electrode PE, for example, a lattice shape, as illustrated in FIG. 35. That is, the counter-electrode TE includes a plurality of first columns TE1 extending in the first direction X, and a plurality of second columns TE2 intersecting with the first columns TE1 and extending in the second direction Y. At the same time, the counter-electrode TE has a plurality of rectangular openings OP3 surrounded by the first columns TE1 and the second columns TE2. The line width of the first columns TE1 and the line width of the second columns TE2 may be the same or different from each other. The opening OP3 of the counter-electrode TE has a dimension slightly larger than that of the pixel electrode PE.

In plan view, the counter-electrode TE faces the boundary region between adjacent pixels without overlapping the pixel electrodes PE. That is, the counter-electrode TE is arranged and formed such that each opening OP3 faces the pixel electrode PE. The counter-electrode TE may be formed in a shape or a size overlapping a part of the pixel electrode.

In the second embodiment, other configurations of the display panel PNL are the same as those of the display panel PNL in the first embodiment described above.

FIG. 37 is a cross-sectional view of the display panel schematically illustrating an action state of the electric field during display.

As illustrated, in the display panel PNL having the above configuration, for example, in the case that white display is performed on electrophoretic layer DL, the pixel electrode PE corresponding to an arbitrary pixel PX is held at a relatively lower potential than common electrode CE. That is, when the potentials of the common electrode CE and the counter-electrode TE are set as reference potentials, the pixel electrode PE is held in a negative polarity, a lateral electric field is formed between the pixel electrode PE and the common electrode CE, and an oblique electric field is formed between the pixel electrode PE and the counter-electrode TE. As a result, positively charged black particles 34b are attracted to the pixel electrode PE, while negatively charged white particles 34a move toward the counter-substrate CT. As a result, when the pixel PX is observed from the counter-substrate CT side, white is visually recognized.

In the case where the pixel PX is displayed in black, when the potentials of the common electrode CE and the counter-electrode TE are set as the reference potentials, the pixel electrode PE is held in a positive polarity, a lateral electric field or an oblique electric field is formed between the pixel electrode PE and the common electrode CE, and an oblique electric field is formed between the pixel electrode PE and the counter-electrode TE. As a result, negatively charged white particles 34a are attracted to the pixel electrodes PE, while positively charged black particles 34b move toward the counter-substrate CT. As a result, when the pixel PX is observed, black is visually recognized.

As described above, in the display panel PNL, the lateral electric field or the oblique electric field is formed between the arbitrary pixel electrode PE and the common electrode CE, so that the dispersion state of the white particles 34a and the black particles 34b is changed, and arbitrary characters, images, and the like can be displayed or rewritten. At the same time, by forming the oblique electric field between the pixel electrode PE and the counter-electrode TE, the electric field concentrated between the pixel electrodes is relaxed, and the electric field near the pixel boundary becomes clear. Therefore, the electrophoretic particles are widely spread to the display surface side, that is, the counter-substrate CT side, the movement of the electrophoretic particles becomes smooth, and the display becomes clear.

As described above, according to the display device DSP of the second embodiment, the plurality of pixel electrodes PE and the common electrode CE are provided on the array substrate AR of the display panel PNL, and the counter-electrode TE is provided on the counter-substrate CT. The display panel PNL drives the electrophoretic elements by a lateral electric field or an oblique electric field generated between the pixel electrode PE and the common electrode CE and an oblique electric field generated between the pixel electrode PE and the counter-electrode TE. By forming the oblique electric field between the pixel electrode PE and the counter-electrode TE, the electric field concentrated between the pixel electrodes is relaxed, and the electric field near the pixel boundary becomes clear. Therefore, the electrophoretic particles widely spread to the display surface side, that is, the counter-substrate CT side, and the display becomes clear.

The counter-electrode TE has a large number of openings OP3 and is formed in a relatively small area. In the present embodiment, the counter-electrode TE does not overlap the pixel electrodes PE in planar view. Therefore, even when the counter-electrode TE is provided on the counter-substrate CT, the permeability of the counter-substrate CT is hardly impaired.

As described above, according to the present embodiment, an electrophoretic display device with improved display performance can be obtained.

In the second embodiment, the array pattern of the pixel electrodes PE, the common electrodes CE, and the counter-electrodes TE is not limited to the above-described embodiment, and can be variously changed. Hereinafter, modifications of the array pattern will be described. In various modifications described later, the same portions as those of the second embodiment described above are denoted by the same reference numerals, and the description thereof may be omitted or simplified.

(Tenth Modification)

FIG. 38 is a plan view schematically illustrating an array pattern of counter-electrodes and pixel electrodes according to a tenth modification. FIG. 39 is a plan view illustrating a common electrode and a pixel electrode for one pixel of an array pattern according to the tenth modification.

As illustrated in FIG. 39, a pixel electrode PE for one pixel has a rectangular shape, for example, a square shape, and further has opening OP2 formed in a spiral shape. As illustrated in FIG. 38, a counter-electrode TE is formed in a shape that does not overlap the pixel electrodes PE, for example, a lattice shape. The counter-electrode TE includes a plurality of first columns TE1 extending in the first direction X, a plurality of second columns TE2 intersecting the first columns TE1 and extending in the second direction Y, and the plurality of rectangular openings OP3 surrounded by the first columns TE1 and the second columns TE2. The counter-electrode TE further integrally includes a plurality of spiral third columns TE3 extending from each second column TE2 into each opening OP3. Each of the plurality of third columns TE3 has a spiral shape corresponding to the opening OP2 of the pixel electrode PE.

The line width of the first column TE1, the line width of the second column TE2, and the line width of the third column TE3 may be the same or different. The opening OP3 of the counter-electrode TE has a dimension slightly larger than that of the pixel electrode PE. The line width of the third column TE3 is slightly smaller than the width of the opening OP2 of the pixel electrode PE.

In plan view, the counter-electrode TE faces the boundary region between adjacent pixels and the opening OP2 without overlapping the pixel electrodes PE. The counter-electrode TE is disposed and formed such that each opening OP3 faces the pixel electrode PE. The counter-electrode TE may be formed in a shape or a size overlapping a part of the pixel electrode.

Also, in the tenth modification configured as described above, it is possible to obtain the same functional effects as those of the second embodiment described above. Furthermore, by generating an oblique electric field between the third column TE3 of the counter-electrode TE and the pixel electrode PE, the intensity of the electric field generated in the central portion of the pixel electrode PE can be increased.

(Eleventh Modification)

FIG. 40 is a plan view schematically illustrating an array pattern of counter-electrodes and pixel electrodes according to an eleventh modification. FIGS. 41A and 41B are plan views illustrating a common electrode and a pixel electrode for one pixel of the array pattern according to the eleventh modification.

As illustrated in FIG. 41A, a pixel electrode PE for one pixel includes a plurality of, for example, eight divisional electrodes PE1. The divisional electrodes PE1 are formed in, for example, rectangular shapes having the same dimension, and are arranged in four rows and two columns at intervals in a staggered manner in the first direction X and the second direction Y. The eight divisional electrodes PE1 are electrically connected to each other via a wiring of the lower layer (not illustrated) or the like. Each of the divisional electrodes PE1 is arranged in a state where the substantial center thereof coincides with an opening OP1 (not illustrated) of a common electrode CE, and overlaps the common electrode CE. In plan view, the divisional electrode PE1 covers the opening OP1 of the common electrode CE.

As illustrated in FIG. 40, a counter-electrode TE is formed in a shape not overlapping the pixel electrode PE, for example, a lattice shape finer than that of the counter-electrode according to the above-described tenth modification. The counter-electrode TE includes a plurality of first columns TE1 extending in the first direction X, a plurality of second columns TE2 intersecting the first columns TE1 and extending in the second direction Y, and the plurality of rectangular openings OP3 surrounded by the first columns TE1 and the second columns TE2. In one pixel, the counter-electrode TE has 16 rectangular openings OP3.

The line width of the first columns TE1 and the line width of the second columns TE2 may be the same or different from each other. The openings OP3 of the counter-electrode TE has a dimension slightly larger than that of the divisional electrodes PE1.

In plan view, the counter-electrode TE faces the boundary region between adjacent pixels and the boundary region between the divisional electrodes PE1 without overlapping the pixel electrode PE. The counter-electrode TE is disposed and formed such that each opening OP3 faces the divisional electrode PE1. The counter-electrode TE may be formed in a shape or a size overlapping a part of the pixel electrode.

Also, in the eleventh modification configured as described above, it is possible to obtain the same functional effects as those of the second embodiment described above. Furthermore, by generating an oblique electric field between the counter-electrode TE and the plurality of divisional electrodes PE1, the intensity of the electric field generated in the central portion of the pixel electrode PE can be increased.

As illustrated in FIG. 41B, in the eleventh modification, the pixel electrode PE may include nine divisional electrodes PE1. The divisional electrodes PE1 are formed in, for example, rectangular shapes having the same dimension, and are arranged in three rows and three columns at intervals in the first direction X and the second direction Y. The nine divisional electrodes PE1 are electrically connected to each other via a wiring of the lower layer (not illustrated) or the like. The counter-electrode TE illustrated in FIG. 40 can also be applied to such a pixel electrode PE.

FIGS. 42A and 42B are plan views illustrating another modification of the pixel electrode in the eleventh modification.

As illustrated in FIG. 42A, in one pixel, the eight divisional electrodes PE1 are not limited to a rectangular shape, and may be circular divisional electrodes PE1. The outer diameter of the divisional electrode PE1 is equal to or smaller than the width of the opening OP3 of the counter-electrode TE.

Alternatively, as illustrated in FIG. 42B, the pixel electrode PE may be a rectangular electrode, and a plurality of circular openings OP2 arranged in a staggered manner may be provided.

The counter-electrode TE illustrated in FIG. 40 can be applied to any of the pixel electrodes PE.

(Twelfth Modification)

FIG. 43 is a plan view schematically illustrating an array pattern of counter-electrodes and pixel electrodes according to a twelfth modification. FIGS. 44A and 44B are plan views illustrating a pixel electrode for one pixel of the array pattern according to the twelfth modification.

As illustrated in FIG. 44A, a pixel electrode PE for one pixel includes a plurality of, for example, eight divisional electrodes PE1. The divisional electrodes PE1 are formed in, for example, rectangular shapes having the same dimension, and are arranged in four rows and two columns at intervals in a staggered manner in the first direction X and the second direction Y. The eight divisional electrodes PE1 are electrically connected to each other via a wiring of the lower layer (not illustrated) or the like. Each of the divisional electrodes PE1 is arranged in a state where the substantial center thereof coincides with an opening OP1 (not illustrated) of a common electrode CE, and overlaps the common electrode CE. In plan view, the divisional electrode PE1 covers the opening OP1 of the common electrode CE.

As illustrated in FIG. 43, a counter-electrode TE includes, for example, a rectangular solid electrode, and has a large number of openings OP3. The openings OP3 are arranged in a staggered manner in the first direction X and the second direction Y. The openings OP3 are formed in, for example, a rectangular shape having the same dimension, and has a dimension slightly larger than that of the divisional electrodes PE1. In one pixel, the counter-electrode TE has, for example, eight openings OP3.

In plan view, the counter-electrode TE faces the boundary region between the adjacent pixels and the boundary region between the adjacent divisional electrodes PE1 without overlapping the divisional electrodes PE1. The counter-electrode TE is disposed and formed such that each opening OP3 faces the divisional electrode PE1. The counter-electrode TE may be formed in a shape or a size overlapping a part of the pixel electrode.

Also, in the twelfth modification configured as described above, it is possible to obtain the same functional effects as those of the second embodiment described above. Furthermore, by generating an oblique electric field between the counter-electrode TE and the plurality of divisional electrodes PE1, the intensity of the electric field generated in the central portion of the pixel electrode PE can be increased.

As illustrated in FIG. 44B, in the twelfth modification, the divisional electrode PE1 of the pixel electrode PE is not limited to a rectangular shape, and may be a circular divisional electrode PE1. The outer diameter of the divisional electrode PE1 is equal to or smaller than the width of the opening OP3 of the counter-electrode TE.

As illustrated in FIG. 45, the pixel electrode PE may be a rectangular electrode, and a plurality of circular openings OP2 arranged in a staggered manner may be provided. In this case, the counter-electrode TE is arranged and formed such that the openings OP3 faces the pixel electrode PE and the counter-electrode TE faces the openings OP2 of the pixel electrode PE.

The counter-electrode TE illustrated in FIG. 43 can be applied to any of the pixel electrode PE.

(Thirteenth Modification)

FIG. 46 is a plan view schematically illustrating an array pattern of counter-electrodes and pixel electrodes according to a thirteenth modification. FIGS. 47A and 47B are plan views illustrating a pixel electrode for one pixel of the array pattern according to the thirteenth modification.

As illustrated in FIG. 47A, a pixel electrode PE for one pixel includes a plurality of, for example, nine divisional electrodes PE1. The divisional electrodes PE1 are formed in, for example, a circular shape having the same dimension, and are arranged in three rows and three columns at intervals in a staggered manner in the first direction X and the second direction Y. One of the nine divisional electrodes PE1 is located across the adjacent pixels. The nine divisional electrodes PE1 are electrically connected to each other via a wiring of the lower layer (not illustrated) or the like. Each of the divisional electrodes PE1 is arranged in a state where the substantial center thereof coincides with an opening OP1 (not illustrated) of a common electrode CE, and overlaps the common electrode CE. In plan view, the divisional electrode PE1 covers the opening OP1 of the common electrode CE.

As illustrated in FIG. 46, a counter-electrode TE is formed in a shape not overlapping the pixel electrode PE, for example, a lattice shape having a large number of openings OP3. The counter-electrode TE includes a plurality of first columns TE1 extending in the first direction X, a plurality of second columns TE2 intersecting the first columns TE1 and extending in the second direction Y, and the plurality of rectangular openings OP3 surrounded by the first columns TE1 and the second columns TE2. In the present modification, at least one of the first columns and the second columns, for example, the second columns TE2 extends in the second direction while being curved in a substantially sine waveform shape. The line width of the first column TE1 and the line width of the second column TE2 may be the same or different from each other.

The openings OP3 surrounded by the first columns TE1 and second columns TE2 are formed in a substantially rectangular shape, and has a size slightly larger than pixel electrode PE for one pixel.

In plan view, the counter-electrode TE faces the boundary region between adjacent pixels without overlapping the pixel electrodes PE. The counter-electrode TE is disposed and formed such that each opening OP3 faces the divisional electrode PE1. The counter-electrode TE may be formed in a shape or a size overlapping a part of the pixel electrode.

Also, in the thirteenth modification configured as described above, it is possible to obtain the same functional effects as those of the second embodiment described above. Furthermore, by generating an oblique electric field between the counter-electrode TE and the plurality of divisional electrodes PE1, the intensity of the electric field generated in the central portion of the pixel electrode PE can be increased.

In the thirteenth modification, the divisional electrode PE1 is not limited to a rectangular shape, and may have another shape, for example, a circular shape. Furthermore, in thirteenth modification, as illustrated in FIG. 47B, the pixel electrode PE may be a substantially rectangular electrode, and a plurality of circular openings OP2 arranged in a staggered manner may be provided.

(Fourteenth Modification)

Figures 48, 49:
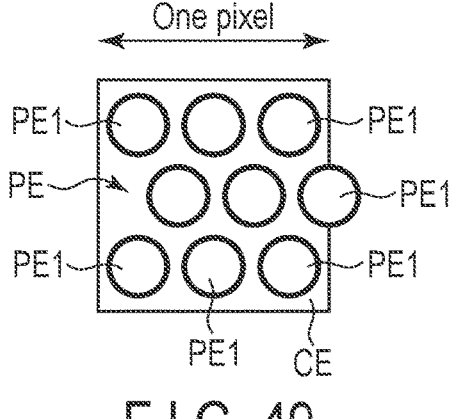
FIG. 48 is a plan view schematically showing an array pattern of counter-electrodes and pixel electrodes according to a fourteenth modification.
FIG. 49 is a plan view showing a common electrode and the pixel electrode for one pixel of the array pattern according to the fourteenth modification.

FIG. 48 is a plan view schematically illustrating an array pattern of counter-electrodes and pixel electrodes according to a fourteenth modification. FIG. 49 is a plan view illustrating a common electrode and a pixel electrode for one pixel of the array pattern according to the fourteenth modification.

As illustrated in FIG. 49, a pixel electrode PE for one pixel includes a plurality of, for example, nine divisional electrodes PE1. The divisional electrodes PE1 are formed in, for example, a circular shape having the same dimension, and are arranged in three rows and three columns at intervals in a staggered manner in the first direction X and the second direction Y. One of the nine divisional electrodes PE1 is located across the adjacent pixels. The nine divisional electrodes PE1 are electrically connected to each other via a wiring of the lower layer (not illustrated) or the like. Each of the divisional electrodes PE1 is arranged in a state where the substantial center thereof coincides with an opening OP1 (not illustrated) of a common electrode CE, and overlaps the common electrode CE. In plan view, the divisional electrode PE1 covers the opening OP1 of the common electrode CE.

As illustrated in FIG. 48, a counter-electrode TE is formed of, for example, a rectangular solid electrode, and has a large number of openings OP3. The openings OP3 are arranged in a staggered manner in the first direction X and the second direction Y. The openings OP3 are formed in, for example, circular shapes having the same dimension, and have a dimension slightly larger than that of the divisional electrodes PE1. In one pixel, the counter-electrode TE has, for example, nine openings OP3.

In plan view, the counter-electrode TE faces the boundary region between the adjacent pixels and the boundary region between the adjacent divisional electrodes PE1 without overlapping the divisional electrodes PE1. The counter-electrode TE is disposed and formed such that each opening OP3 faces the divisional electrode PE1. The counter-electrode TE may be formed in a shape or a size overlapping a part of the pixel electrode.

Also, in the fourteenth modification configured as described above, it is possible to obtain the same functional effects as those of the second embodiment described above. Furthermore, by generating an oblique electric field between the counter-electrode TE and the plurality of divisional electrodes PE1, the intensity of the electric field generated in the central portion of the pixel electrode PE can be increased.

In the fourteenth modification, the divisional electrode PE1 of the pixel electrode PE is not limited to the circular shape, and may be a rectangular divisional electrode PE1. Similarly, the opening OP3 of the counter-electrode TE is not limited to the circular shape, and may have another shape, for example, a rectangular shape.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Note that all the structures which can be carried out by any modification and variation conceived within the scope and spirit of the invention by a person having ordinary skill in the art based on each structural element described in the embodiments are naturally encompassed in the scope of invention of the present application. For example, the outer shape of the display panel is not limited to the rectangular shape, and may be other shapes such as a polygonal shape, a circular shape, an elliptical shape, and a shape obtained by combining these shapes in plan view. The materials of the constituent members of the display device are not limited to the above-described examples, and various materials can be selected. The first to ninth modifications described above can also be applied to the second embodiment.

Further, regarding the present embodiments, any advantage and effect which would be obvious from the description of the specification or arbitrarily conceived by a skilled person are naturally considered achievable by the present invention.

What is claimed is:

1. An electrophoretic display device comprising:
an array substrate including a base material, a common electrode provided on the base material, a plurality of pixel electrodes provided to face the common electrode, and an insulating layer provided between the common electrode and the pixel electrodes;
a counter-substrate facing the array substrate;
an electrophoretic layer including a plurality of electrophoretic elements and disposed between the array substrate and the counter-substrate;
a drive unit which drives the electrophoretic elements by a lateral electric field generated between the pixel electrodes and the common electrode; and
a display region including a plurality of pixels arrayed in a matrix,
wherein the common electrode is provided over the plurality of pixels,
the pixel electrodes are arrayed in a matrix, and in one pixel, at least a part of the pixel electrode faces the common electrode in plan view, and
in one pixel, the common electrode includes an opening, and the pixel electrode faces the opening in plan view.

2. The electrophoretic display device of claim 1, wherein in one pixel, a portion of the pixel electrode excluding a peripheral edge portion faces the common electrode in plan view.

3. The electrophoretic display device of claim 1, wherein the opening of the common electrode is formed in a spiral shape, and the pixel electrode is formed in a spiral shape and faces the opening.

4. The electrophoretic display device of claim 1, wherein the opening of the common electrode is formed in an annular shape, and the pixel electrode is formed in an annular shape and faces the opening.

5. The electrophoretic display device of claim 1, wherein in one pixel, the pixel electrode has an opening, and the opening of the pixel electrode faces the common electrode in plan view.

6. The electrophoretic display device of claim 1, wherein in one pixel, the pixel electrode includes an opening, the pixel electrode faces the opening of the common electrode and the opening of the pixel electrode faces the common electrode in plan view.

7. The electrophoretic display device of claim 6, wherein in one pixel, the common electrode includes a plurality of openings, the pixel electrode includes a plurality of openings, the pixel electrode faces the plurality of openings of the common electrode and the plurality of openings of the pixel electrode faces the common electrode in plan view.

8. The electrophoretic display device of claim 7, wherein each of the plurality of openings of the common electrode is formed in an annular shape, and at least one of the plurality of openings of the pixel electrode is formed in an annular shape.

9. The electrophoretic display device of claim 1, wherein in one pixel, the common electrode includes a plurality of openings provided apart from each other, and the pixel electrode includes a plurality of divisional electrodes provided to face the openings of the common electrode respectively.

10. The electrophoretic display device of claim 9, wherein the plurality of openings of the common electrode are formed in the same shape and size, and the plurality of divisional electrodes are formed in the same shape and size.

11. The electrophoretic display device of claim 9, wherein in one pixel, the plurality of openings of the common electrode are arranged in a matrix at intervals in a first direction and a second direction intersecting the first direction.

12. The electrophoretic display device of claim 9, wherein in one pixel, the plurality of openings of the common electrode are arranged in a staggered manner at intervals in a first direction and a second direction intersecting the first direction.

13. The electrophoretic display device of claim 1, wherein the counter-substrate does not include a counter-electrode.

14. The electrophoretic display device of claim 1, further comprising:
a counter-electrode provided on the counter-substrate and facing the electrophoretic layer,
wherein the counter-electrode includes a plurality of openings respectively facing the pixel electrodes, and
wherein the drive unit drives the electrophoretic elements by an oblique electric field generated between the pixel electrode and the counter-electrode.

15. The electrophoretic display device of claim 14, further comprising:
a display region including a plurality of pixels arrayed in a matrix,
wherein the counter-electrode is formed in a lattice shape having a plurality of openings, and faces a boundary region between the pixels in plan view.

16. The electrophoretic display device of claim 15, wherein the counter-electrode includes a plurality of first columns each extending in a first direction, and a plurality of second columns each extending in a second direction intersecting the first direction and intersecting the first columns.

17. The electrophoretic display device of claim 16, wherein at least one of the first columns and the second columns extends while being curved in a wave shape.

18. An electrophoretic display device comprising:
an array substrate including a base material, a common electrode provided on the base material, a plurality of pixel electrodes provided to face the common electrode, and an insulating layer provided between the common electrode and the pixel electrodes;
a counter-substrate facing the array substrate;
an electrophoretic layer including a plurality of electrophoretic elements and disposed between the array substrate and the counter-substrate;

a drive unit which drives the electrophoretic elements by a lateral electric field generated between the pixel electrodes and the common electrode;
a counter-electrode provided on the counter-substrate and facing the electrophoretic layer; and
a display region including a plurality of pixels arrayed in a matrix,
wherein the counter-electrode includes a plurality of openings respectively facing the pixel electrodes,
wherein the drive unit drives the electrophoretic elements by an oblique electric field generated between the pixel electrode and the counter-electrode,
wherein, in one pixel, the counter-electrode includes a plurality of openings arranged at intervals in a first direction and a second direction intersecting the first direction, and
wherein, in one pixel, the pixel electrode includes a plurality of divisional electrodes respectively facing the plurality of openings of the counter-electrode in plan view.

19. An electrophoretic display device comprising:
an array substrate including a base material, a common electrode provided on the base material, a plurality of pixel electrodes provided to face the common electrode, and an insulating layer provided between the common electrode and the pixel electrodes;
a counter-substrate facing the array substrate;
an electrophoretic layer including a plurality of electrophoretic elements and disposed between the array substrate and the counter-substrate;
a drive unit which drives the electrophoretic elements by a lateral electric field generated between the pixel electrodes and the common electrode;
a counter-electrode provided on the counter-substrate and facing the electrophoretic layer; and
a display region including a plurality of pixels arrayed in a matrix,
wherein the counter-electrode includes a plurality of openings respectively facing the pixel electrodes,
wherein the drive unit drives the electrophoretic elements by an oblique electric field generated between the pixel electrode and the counter-electrode,
wherein, in one pixel, the counter-electrode includes a plurality of openings arranged at intervals in a first direction and a second direction intersecting the first direction, and
wherein, in one pixel, the pixel electrode includes a plurality of openings respectively facing the counter-electrode in plan view.

* * * * *